United States Patent
Fukuura

(10) Patent No.: US 12,521,792 B2
(45) Date of Patent: Jan. 13, 2026

(54) METHOD FOR PRODUCING LAYERED PRODUCT

(71) Applicant: SUMITOMO CHEMICAL COMPANY, LIMITED, Tokyo (JP)

(72) Inventor: Tomohiro Fukuura, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/279,660

(22) PCT Filed: Jul. 20, 2022

(86) PCT No.: PCT/JP2022/028199
§ 371 (c)(1),
(2) Date: Aug. 31, 2023

(87) PCT Pub. No.: WO2023/008279
PCT Pub. Date: Feb. 2, 2023

(65) Prior Publication Data
US 2024/0149337 A1      May 9, 2024

(30) Foreign Application Priority Data

Jul. 28, 2021   (JP) .................................. 2021-123210
Dec. 23, 2021   (JP) .................................. 2021-209090

(51) Int. Cl.
*B22F 1/18*      (2022.01)
*C23C 18/16*     (2006.01)
(Continued)

(52) U.S. Cl.
CPC ............ *B22F 1/18* (2022.01); *C23C 18/1639* (2013.01); *C23C 18/165* (2013.01);
(Continued)

(58) Field of Classification Search
None
See application file for complete search history.

(56) References Cited

U.S. PATENT DOCUMENTS

| | | | |
|---|---|---|---|
| 5,866,433 A | 2/1999 | Schalkhammer et al. | |
| 6,770,369 B1* | 8/2004 | Oyamada | H01R 13/03 |
| | | | 428/407 |
| 2021/0363322 A1 | 11/2021 | Akaike et al. | |

FOREIGN PATENT DOCUMENTS

| | | |
|---|---|---|
| JP | 8-271431 A | 10/1996 |
| JP | 2008-55570 A | 3/2008 |

(Continued)

OTHER PUBLICATIONS

Pavoski et al. "Silver nanoparticles encapsulated in silica: Synthesis, characterization and application as antibacterial fillers in the ethylene polymerization" (2019). European Polymer Journal 117 (2019). 117, p. 38-54 (Year: 2019).*

(Continued)

*Primary Examiner* — Jose I Hernandez-Kenney
(74) *Attorney, Agent, or Firm* — Birch, Stewart, Kolasch & Birch, LLP

(57) ABSTRACT

The present invention provides a novel method for producing a structure comprising an assembly of metal-based particles. Provided is a method for producing a layered product, the layered product comprising a substrate having a three-dimensional surface; and a metal-based particle assembly layer arranged on the three-dimensional surface and comprising a plurality of metal-based particles arranged apart from each other, the method comprising the step of forming the metal-based particle assembly layer on the three-dimensional surface by immersing the substrate in a plating solution containing a cation of a metal constituting the metal-based particles to reduce the cation, wherein a (Continued)

$V_S/V_L$ ratio of volume $V_S$ [cm$^3$] of the substrate to volume $V_L$ [cm$^3$] of the plating solution is 0.03 or less.

15 Claims, 10 Drawing Sheets

(51) Int. Cl.
    *C23C 18/44*     (2006.01)
    *C23C 22/02*     (2006.01)
    *G01N 33/531*     (2006.01)
    *G01N 33/543*     (2006.01)
    *G01N 21/64*     (2006.01)

(52) U.S. Cl.
    CPC .......... *C23C 18/1658* (2013.01); *C23C 18/44* (2013.01); *C23C 22/02* (2013.01); *G01N 33/531* (2013.01); *G01N 33/54313* (2013.01); *B22F 2301/255* (2013.01); *B22F 2302/256* (2013.01); *B22F 2998/10* (2013.01); *G01N 21/6428* (2013.01)

(56) References Cited

FOREIGN PATENT DOCUMENTS

| JP | 2008055570 A | * | 3/2008 | |
| WO | WO-2011096394 A1 | * | 8/2011 | ........... G01N 21/648 |
| WO | WO 2019/155924 A1 | | 8/2019 | |

OTHER PUBLICATIONS

"Products". Creative Diagnostics [online, archived by web.archive.org]. (Jan. 27, 2021). https://www.cd-bioparticles.com (Year: 2021).*

Fukuura et al., "Long Range Enhancement of Molecular Fluorescence by Closely Packed Submicro-scale Ag Islands," e-Journal of Surface Science and Nanotechnology, vol. 7, 2009, pp. 653-659.

International Search Report (PCT/ISA/210) issued in PCT/JP2022/028199, dated Sep. 27, 2022.

* cited by examiner

[Figure 1]
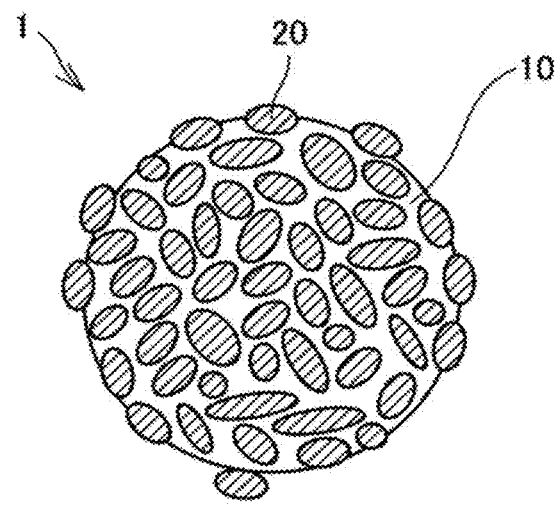
[Figure 2]
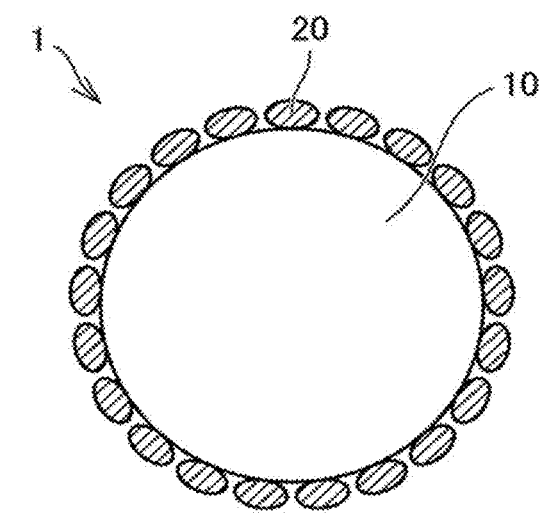

[Figure 3]
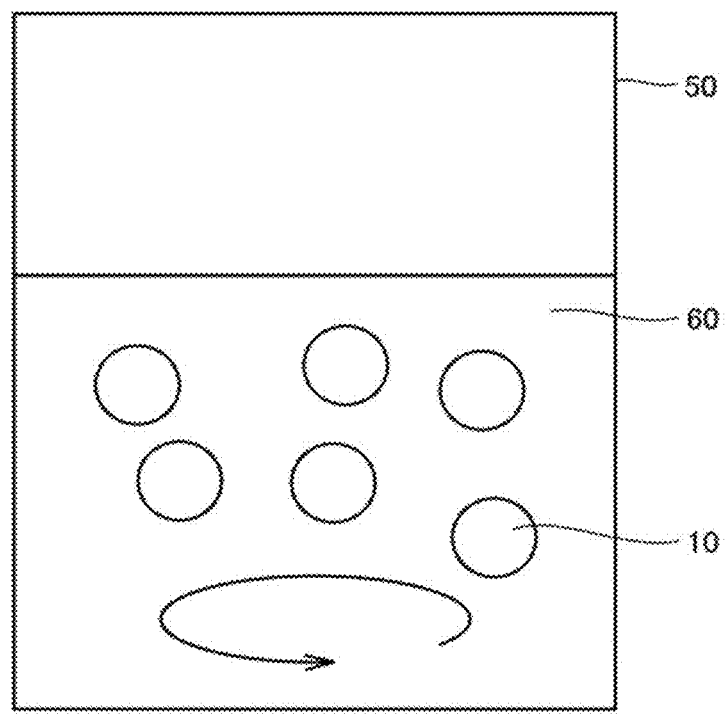
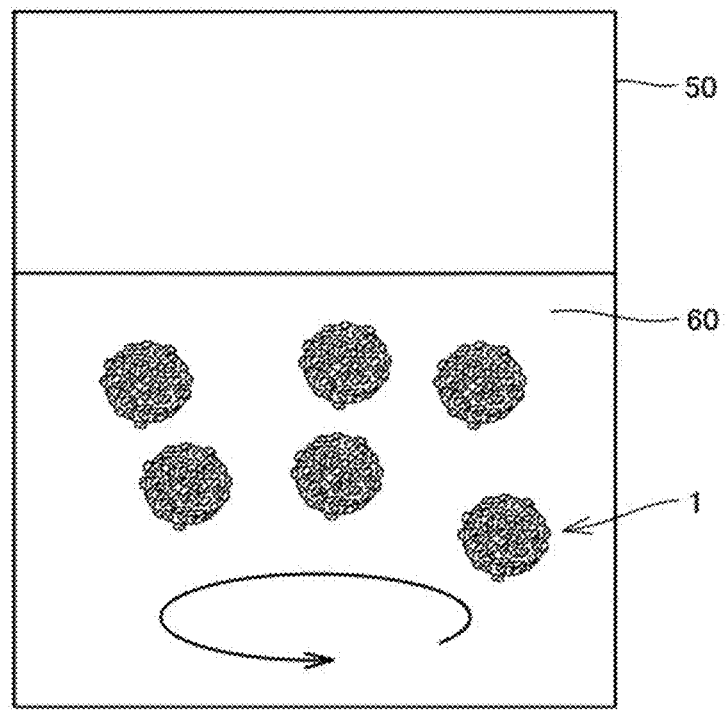

[Figure 4]
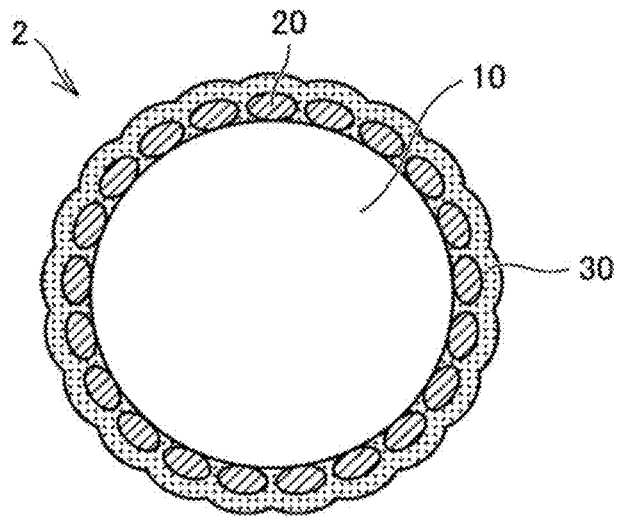
[Figure 5]
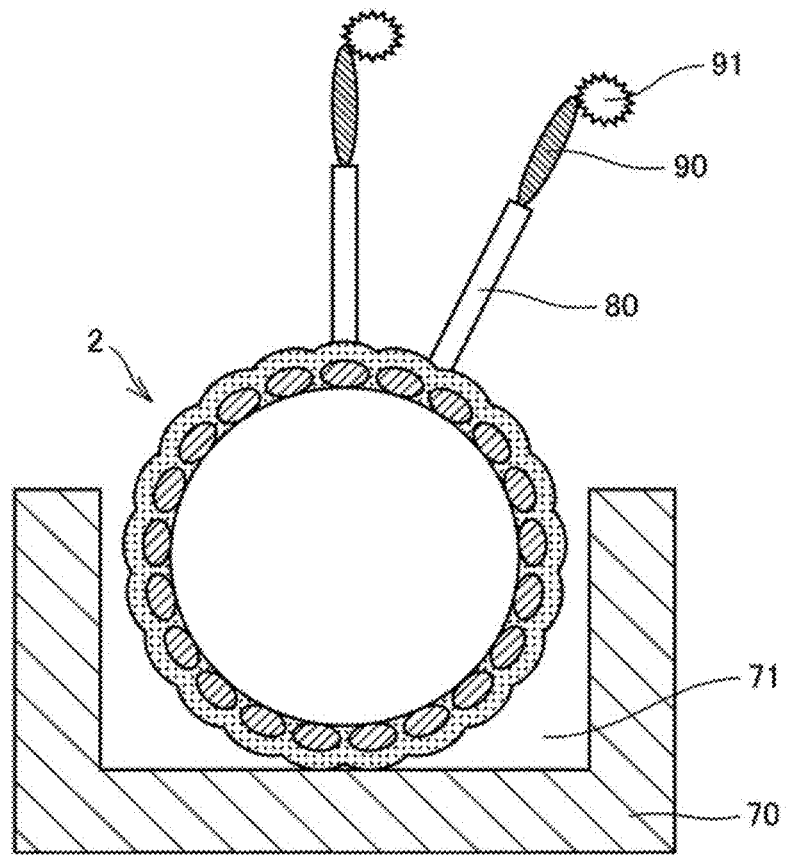

[Figure 6]
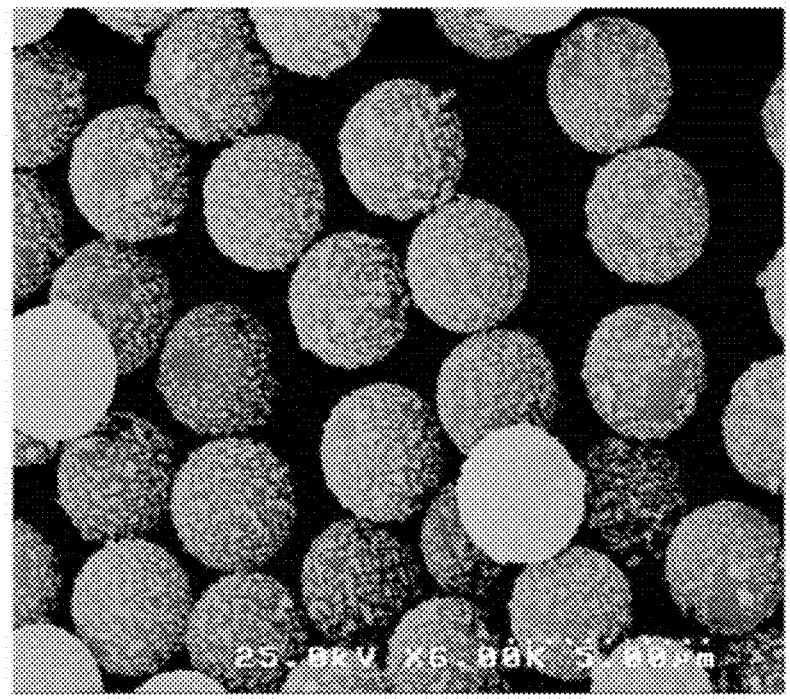
[Figure 7]
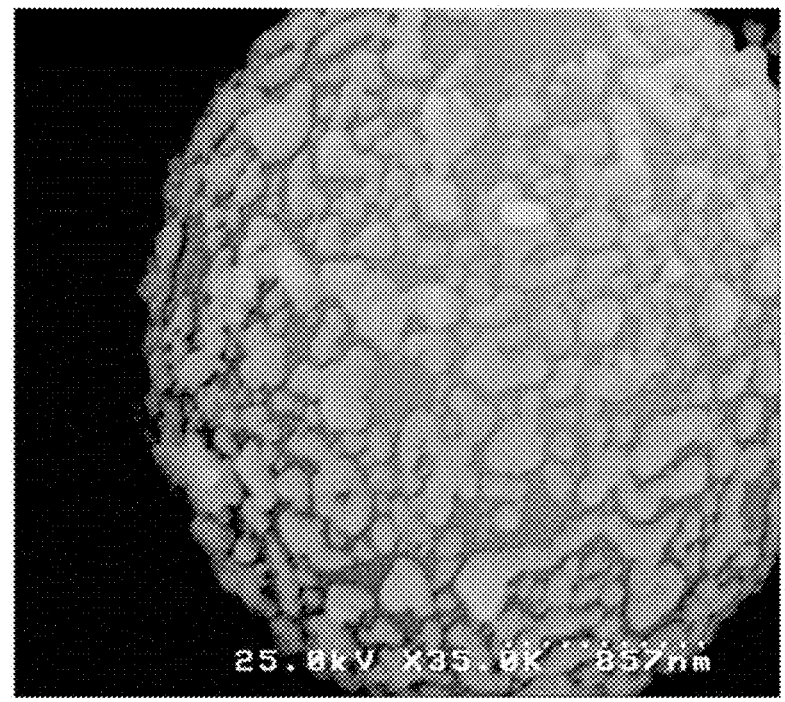

[Figure 8]
[Figure 9]
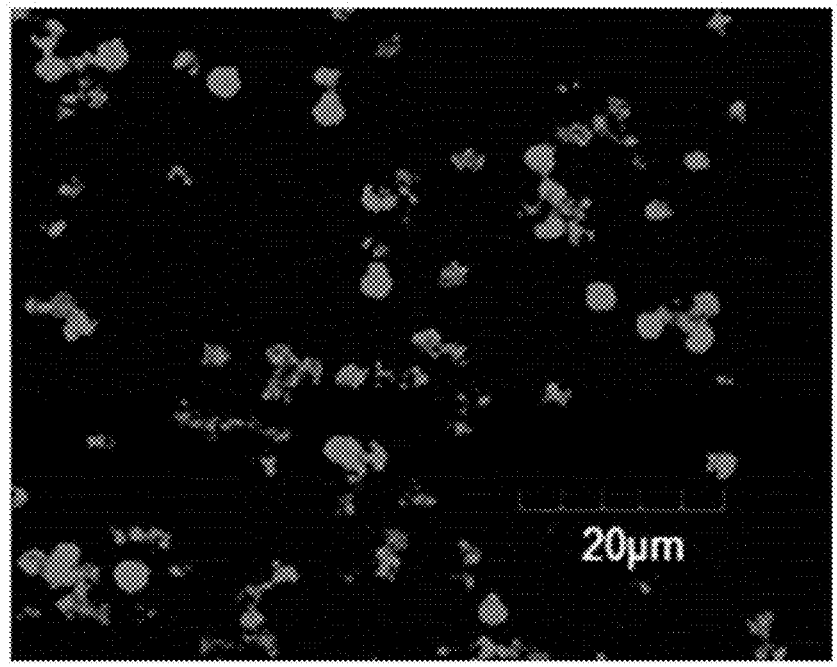

[Figure 10]
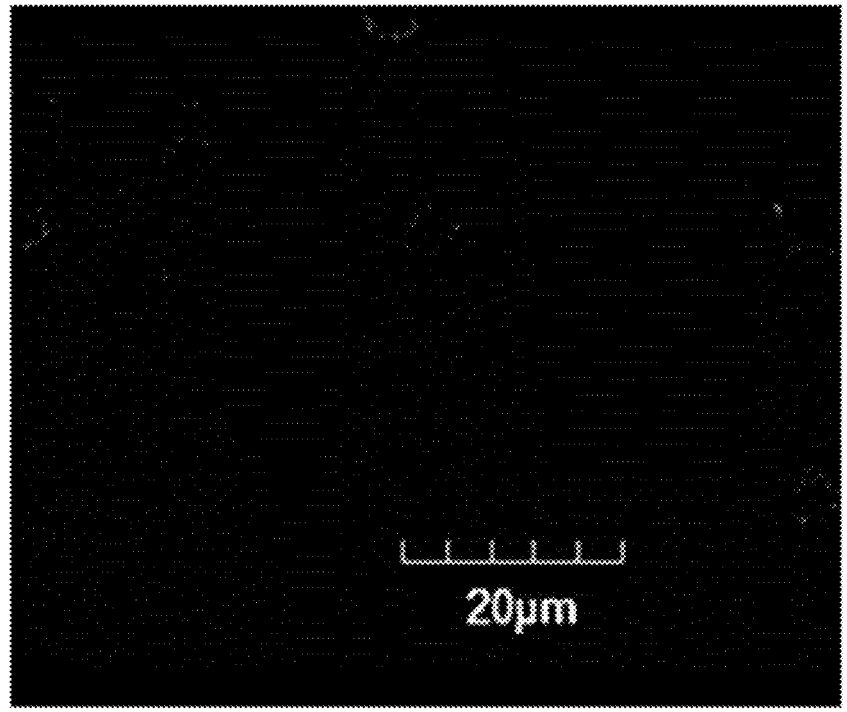
[Figure 11]
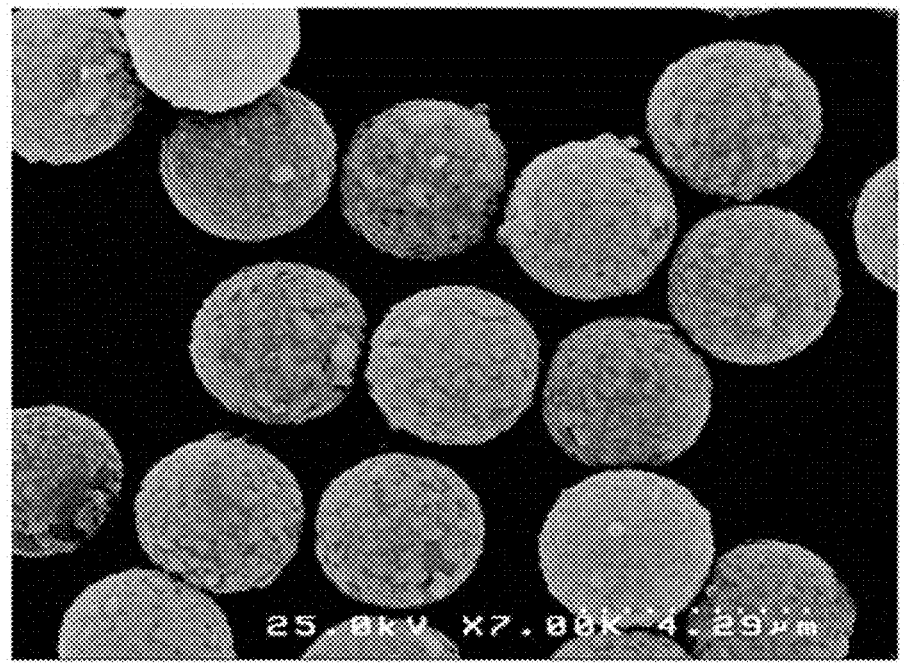

[Figure 12]
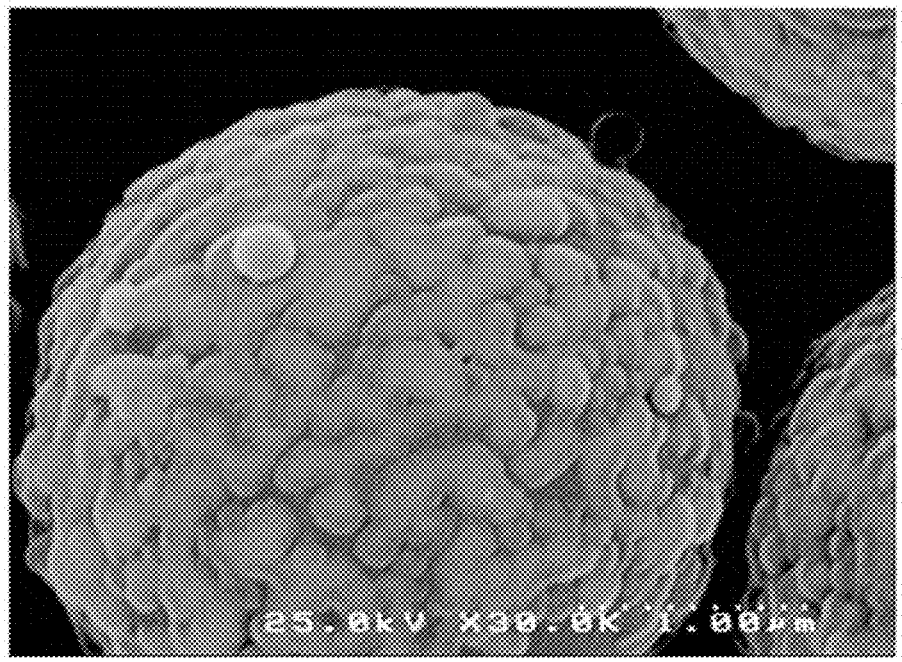
[Figure 13]
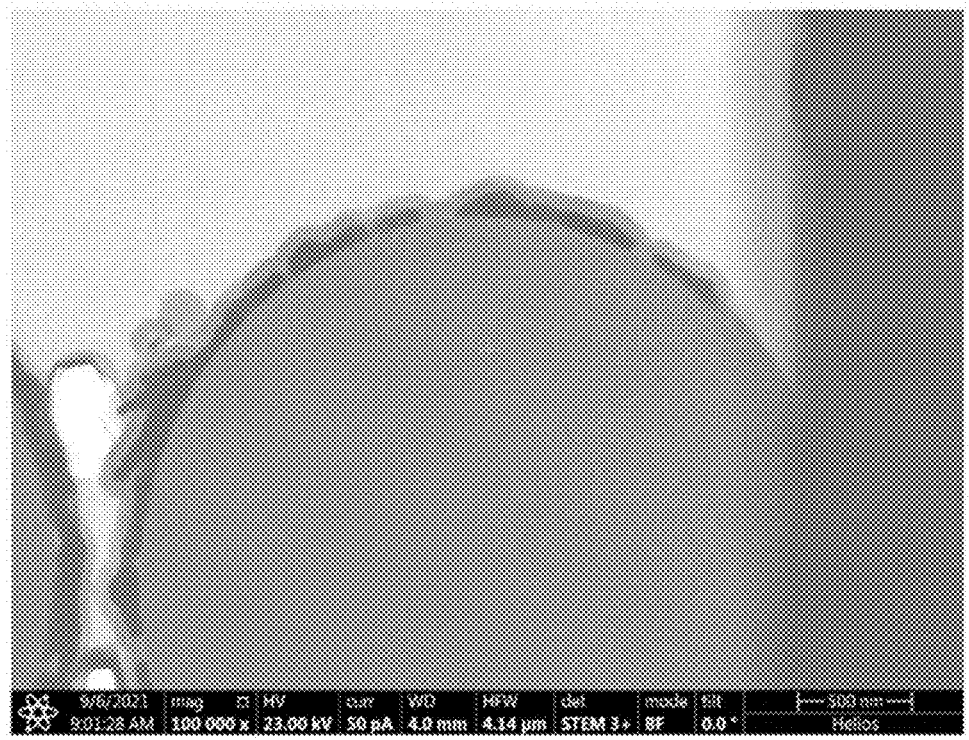

[Figure 14]
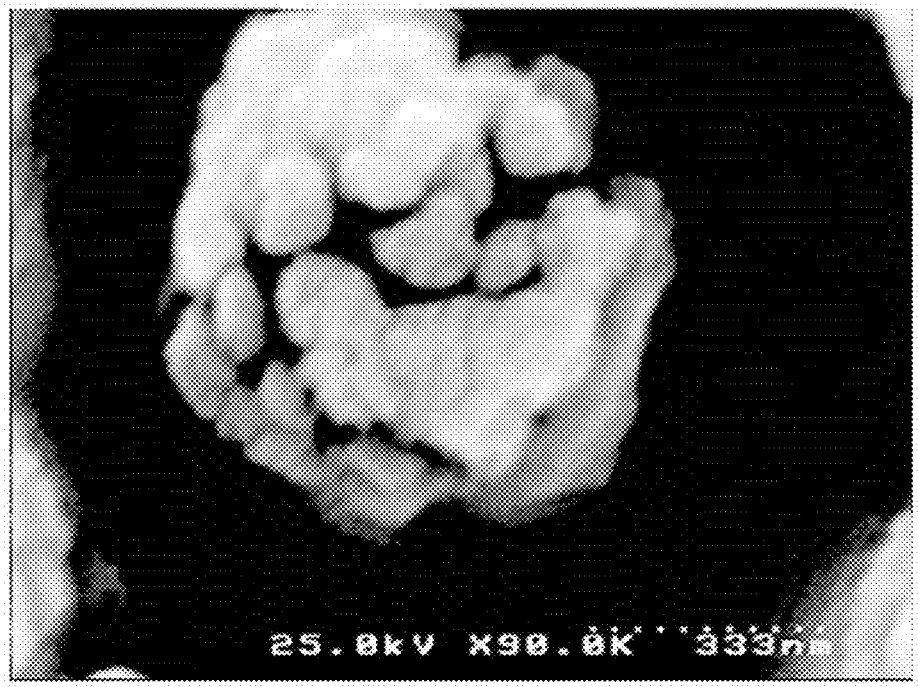
[Figure 15]
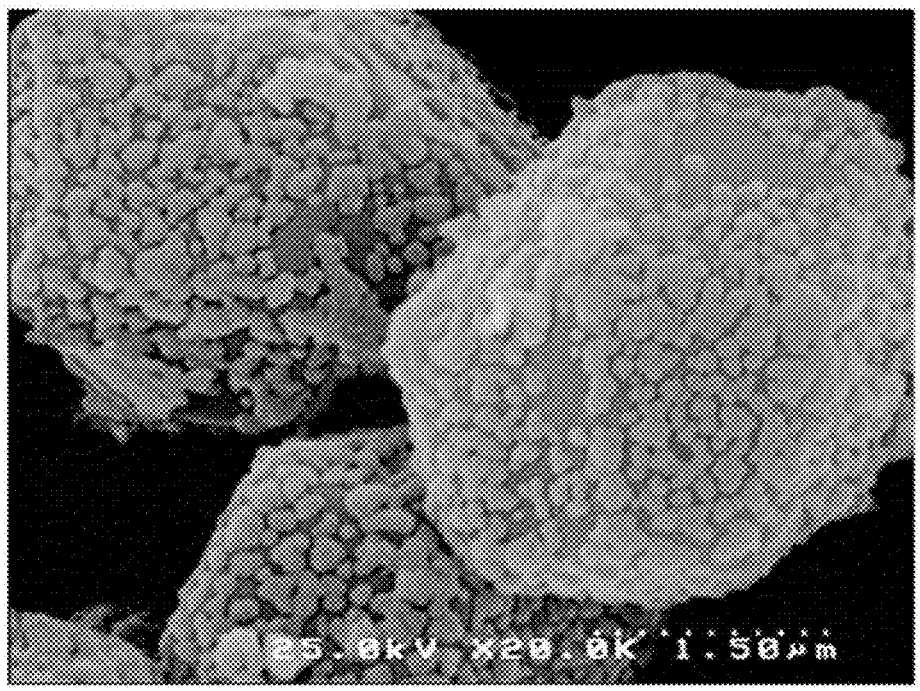

[Figure 16]
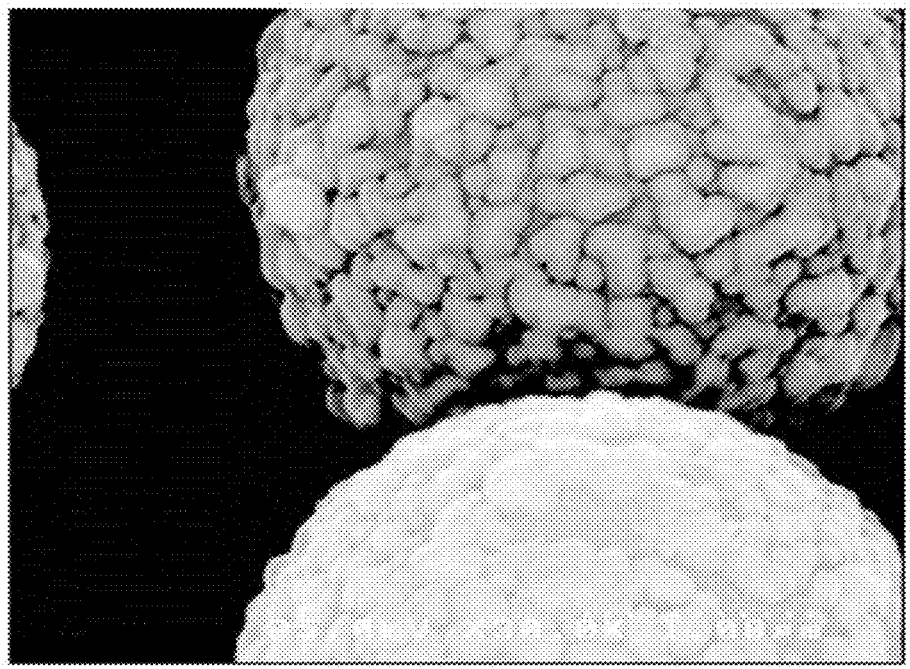
[Figure 17]

[Figure 18]
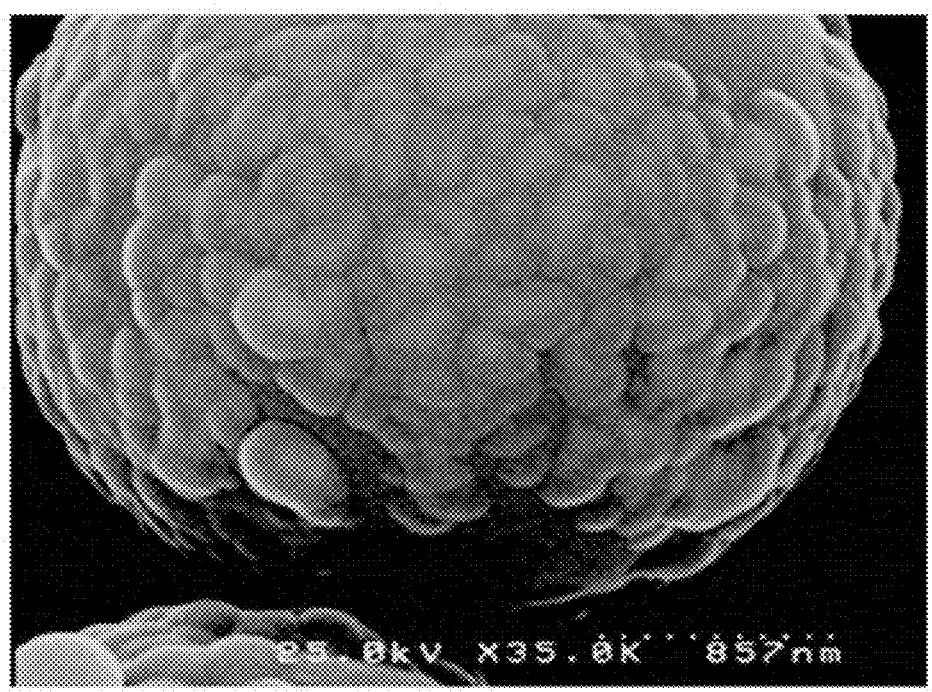

METHOD FOR PRODUCING LAYERED PRODUCT

TECHNICAL FIELD

The present invention relates to a method for producing a layered product.

BACKGROUND ART

A technique exploiting localized plasmon resonance phenomenon of metal nanoparticles for enhanced fluorescence is known (for example, Patent Literature 1). Non Patent Literature 1 indicates a study on localized plasmon resonance of silver nanoparticles.

CITATION LIST

Patent Literature

Patent Literature 1: Japanese Patent Laid-Open No. 8-271431

Non Patent Literature

Non Patent Literature 1: T. Fukuura and M. Kawasaki, "Long Range Enhancement of Molecular Fluorescence by Closely Packed Submicro-scale Ag Islands", e-Journal of Surface Science and Nanotechnology, 2009, 7, 653

SUMMARY OF INVENTION

Technical Problem

An object of the present invention is to provide a novel method for producing a structure comprising an assembly of metal-based particles.

Solution to Problem

The present invention provides the following method for producing a layered product:

[1] A method for producing a layered product, the layered product comprising:
a substrate having a three-dimensional surface; and
a metal-based particle assembly layer arranged on the three-dimensional surface and comprising a plurality of metal-based particles arranged apart from each other, the method comprising a step of:
forming the metal-based particle assembly layer on the three-dimensional surface by immersing the substrate in a plating solution containing a cation of a metal constituting the metal-based particles to reduce the cation,
wherein a $V_S/V_L$ ratio of volume $V_S$ [cm³] of the substrate to volume $V_L$ [cm³] of the plating solution is 0.03 or less.

[2] The method according to [1], wherein in the metal-based particle assembly layer of the layered product, the plurality of metal-based particles have an average particle diameter of 5 nm or more and 1600 nm or less.

[3] The method according to [1] or [2], wherein in the metal-based particle assembly layer of the layered product, the plurality of metal-based particles are each arranged so that an average distance between metal-based particles adjacent to each other is 1 nm or more and 150 nm or less.

[4] The method according to any one of [1] to [3], wherein in the step of forming the metal-based particle assembly layer, an average height growth rate of the metal-based particles at 28 minutes from the start of deposition of the metal onto the three-dimensional surface is 6 nm/min or less.

[5] The method according to any one of [1] to [4], wherein the substrate is a particle.

[6] The method according to [5], wherein the step of forming the metal-based particle assembly layer satisfies the following expression (1):

$$10 \times 10^{-7} \leq X \leq 600 \times 10^{-7} \quad (1)$$

wherein, when the particle is spherical, X is represented by the following expression:

$$X = \left(\frac{3aVD}{4\pi BC} + R^3\right)^{\frac{1}{3}} - R \quad \text{[Expression 1]}$$

wherein a represents the cation concentration (mol/L) in the plating solution; V represents the volume (L) of the plating solution; D represents the atomic weight of the metal (zero-valent) produced by reduction of the cation; B represents the particle number (particles) of the substrate; C represents the specific gravity (g/cm³) of the metal (zero-valent) produced by reduction of the cation; and R represents the radius (cm) of the particle; and when the particle has an irregular shape, X is represented by the following expression:

$$X = \frac{aVD}{SC} \quad \text{[Expression 2]}$$

wherein a, V, D, and C represent the same meanings as set forth above; and S represents a sum total of surface areas of the particle.

[7] The method according to any one of [1] to [6], wherein the plating solution further contains a reducing agent capable of reducing the cation.

[8] The method according to [7], wherein the reducing agent has a standard redox potential of −0.5 V or more.

[9] The method according to [7] or [8], wherein the reducing agent is glucose.

[10] The method according to any one of [1] to [9], wherein the plating solution further contains a complexing agent.

[11] The method according to [10], wherein the complexing agent is ammonia or an amine-based complexing agent.

[12] The method according to any one of [1] to [11], further comprising, after the step of forming the metal-based particle assembly layer, the step of forming a protective layer comprising an insulating material on the metal-based particle assembly layer.

[13] The method according to [12], wherein the protective layer is formed using a sol-gel method.

[14] The method according to [12] or [13], wherein the insulating material is $SiO_2$.

[15] The method according to any one of [12] to [14], wherein the protective layer has a thickness of 300 nm or less.

Advantageous Effects of Invention

There is provided a novel method for producing a structure comprising an assembly of metal-based particles.

BRIEF DESCRIPTION OF DRAWINGS

FIG. 1 is a plan view schematically showing one example of the layered product.

FIG. 2 is a cross-sectional view schematically showing one example of the layered product.

FIG. 3 is a schematic diagram for illustrating one example of the metal-based particle assembly layer formation step.

FIG. 4 is a cross-sectional view schematically showing another example of the layered product.

FIG. 5 is a cross-sectional view schematically showing one example of the sensor element.

FIG. 6 shows a SEM image (at a scale of 6000 times) of the layered products obtained in Example 1.

FIG. 7 shows a SEM image (at a scale of 35000 times) of the layered products obtained in Example 1.

FIG. 8 shows a SEM image (at a scale of 20000 times) of the layered products obtained in Example 2.

FIG. 9 shows an image obtained by fluorescence intensity measurement for the measurement sample 1.

FIG. 10 shows an image obtained by fluorescence intensity measurement for the measurement sample 2.

FIG. 11 shows a SEM image (at a scale of 7000 times) of the layered products including a protective layer obtained in Example 3.

FIG. 12 shows a SEM image (at a scale of 30000 times) of the layered products including a protective layer obtained in Example 3.

FIG. 13 shows a STEM cross-sectional image (at a scale of 100000 times) of the layered products including a protective layer obtained in Example 3.

FIG. 14 shows a SEM image (at a scale of 90000 times) of the layered products obtained in Example 5.

FIG. 15 shows a SEM image (at a scale of 20000 times) of the layered products obtained in Example 6.

FIG. 16 shows a SEM image (at a scale of 30000 times) of the layered products including a protective layer obtained in Example 7.

FIG. 17 shows a SEM image (at a scale of 35000 times) of the layered products including a protective layer obtained in Example 8.

FIG. 18 shows a SEM image (at a scale of 35000 times) of the layered products including a protective layer obtained in Example 9.

DESCRIPTION OF EMBODIMENTS

<Method for Producing Layered Product and Layered Product>

The method for producing a layered product according to the present invention (hereinafter also simply referred to as the "method for producing a layered product") and a layered product obtained by the method will be hereinafter described with reference to embodiments.

As used herein, the "layered product" refers to a layered structure comprising a substrate having a three-dimensional surface; and a metal-based particle assembly layer arranged on the three-dimensional surface and comprising a plurality of metal-based particles (particles composed of a metal) arranged apart from each other. The layered structure may include other layers besides the above-mentioned layers.

The "three-dimensional surface" of the substrate means a three-dimensional surface, including, for example, a curved surface.

FIG. 1 is a plan view schematically showing one example of the layered product, and FIG. 2 is a cross-sectional view schematically showing one example of the layered product. In the example shown in FIGS. 1 and 2, a substrate 10 having a three-dimensional surface is a substrate in the form of a particle (core particle), in which the entire surface of the substrate is a curved surface. A layered product 1 shown in FIGS. 1 and 2 is a composite particle comprising the substrate 10 having a three-dimensional surface (core particle); and a metal-based particle assembly layer arranged on at least a portion (preferably the entire surface) of the three-dimensional surface of the substrate 10. The metal-based particle assembly layer is an assembly of a plurality of metal-based particles 20 supported on the substrate 10, and is a layer comprising the plurality of metal-based particles 20 arranged apart from each other.

In the example shown in FIGS. 1 and 2, the metal-based particle assembly layer is arranged on the entire three-dimensional surface of the substrate 10. It is noted, however, that because the plurality of metal-based particles 20 constituting the metal-based particle assembly layer are spaced apart from each other, the metal-based particle assembly layer includes regions where the metal-based particles 20 are absent, and the surface of the substrate 10 is exposed through these regions.

The method for producing a layered product comprises the step of forming the metal-based particle assembly layer on the three-dimensional surface of the substrate by immersing the substrate in a plating solution containing a cation of a metal constituting the metal-based particles (hereinafter also referred to as the "metal cation") to reduce the cation (metal-based particle assembly layer formation step). The method for producing a layered product may further comprise, after the metal-based particle assembly layer formation step, a step of forming a protective layer comprising an insulating material on the metal-based particle assembly layer (protective layer formation step).

(1) Metal-Based Particle Assembly Layer Formation Step

In the metal-based particle assembly layer formation step, the substrate is immersed in a plating solution containing the metal cation constituting the metal-based particles, and reduction of the metal cation is performed. This step can be performed, for example, as shown in FIG. 3, by adding the substrate 10 with stirring to a plating solution 60 containing the metal cation contained in a bath 50. When the substrate 10 is immersed in the plating solution 60 containing the metal cation, the metal (zero-valent) produced by reduction of the metal cation starts to deposit on the surface of the substrate 10. With passage of the reaction time, the deposited metal grows into particles to form an assembly of the metal-based particles (the metal-based particle assembly layer). The metal-based particle assembly layer is preferably formed on the entire three-dimensional surface of the substrate 10, more preferably on the entire surface of the substrate 10.

The substrate 10 is not limited to a particular substrate as long as it has a three-dimensional surface, and examples include a substrate having a surface formed by a curved surface as the three-dimensional surface and a substrate having a surface with recesses and projections as the three-dimensional surface. A preferred example of the substrate 10 is, for example, the particle as shown in FIGS. 1 and 2. Examples of the shape of the particle include a spherical shape, a spheroidal shape, and a polyhedral shape. A portion of the surface of the particle may be formed by a curved surface, with the remaining portion being formed by a flat surface. Alternatively, the particle may have an irregular shape. The particle is preferably spherical or substantially spherical.

When the substrate 10 is a particle, the particle has a particle diameter of, for example, 0.3 µm or more and 5000 µm or less. The particle diameter may be, for example, 0.3 µm or more and 10 µm or less, preferably 0.5 µm or more and 8 µm or less, more preferably 1 µm or more and 5 µm or less, and still more preferably 1 µm or more and 4 µm or less.

The particle diameter is measured according to the following method: The scanning electron microscope "JSM-5500" produced by JEOL Ltd. or its equivalent is used to obtain a SEM image including a particle as observed from directly above a substrate (such as a glass substrate) to which the particle is adhered. In the SEM image, five tangential diameters are drawn at random in the particle image (note that all the straight lines serving as the tangential diameters can pass through only the inside of the particle image, and one of these lines is a straight line that passes through only the inside of the particle and can be drawn the longest), and the average value thereof (average tangential diameter) is obtained as the particle diameter of the particle. The tangential diameter is defined as a perpendicular line connecting a distance defined by two parallel lines sandwiching the particle contour (projected image) in contact therewith (see the Nikkan Kogyo Shimbun, Ltd., "Particle Measurement Technique," 1994, page 5).

A group of particles formed of a plurality of the above-described particles that can be used as the substrates 10 have an average particle diameter of, for example, 0.3 µm or more and 5000 µm or less. The average particle diameter may be, for example, 0.3 µm or more and 10 µm or less, preferably 0.5 µm or more and 8 µm or less, more preferably 1 µm or more and 5 µm or less, and still more preferably 1 µm or more and 4 µm or less.

The average particle diameter is measured according to the following method: The scanning electron microscope "JSM-5500" produced by JEOL Ltd. or its equivalent is used to obtain a SEM image including a group of particles as observed from directly above a substrate (such as a glass substrate) to which the group of particles are adhered. In the SEM image, 10 particles are selected at random, and five tangential diameters are drawn at random in each particle image (note that all the straight lines serving as the tangential diameters can pass through only the inside of the particle image, and one of these lines is a straight line that passes through only the inside of the particle and can be drawn the longest), and the average value thereof (average tangential diameter) is obtained. Average tangential diameters are obtained for all the 10 selected particles. The tangential diameter is defined as set forth above. A quarter length of the average tangential diameter of each particle is defined as the "edge region length" of each particle. The range of the "edge region length" from the contour line toward the inside of each particle, on the SEM image of the particle, is defined as the "edge region" of each particle. Then, if any particle of the 10 particles overlaps even partially with the edge region of another particle, the particle is discarded, and then an insufficient number of particles are newly selected at random, and average tangential diameters are obtained in the same manner as above. This procedure is repeated as required to obtain average tangential diameters for 10 particles that do not overlap with the edge region. The average value of the 10 average tangential diameters thus obtained is obtained as the average particle diameter.

The material of the substrate 10 is not limited to a particular material. It is noted, however, that the metal-based particle assembly layer formed on the substrate 10 is preferably a plasmonic structure, as described below, and for this reason, the substrate 10 is non-conductive. From this viewpoint, the substrate 10 preferably contains an insulating material, and more preferably is formed of an insulating material. Examples of the insulating material include inorganic insulating materials, such as silica, titania, alumina, and silicon nitride; and organic insulating materials, such as resin materials (for example, polystyrene, acrylic resin, cellulose nanofibers, paper, nitrocellulose, and epoxy resin). Other examples may include semiconductors such as silicon. When it is desired to obtain a layered product containing the substrate 10 that is spherical or substantially spherical, the material of the substrate 10 is preferably silica, which facilitates industrial production of spherical or substantially spherical particles.

The substrate 10 preferably has light-transmitting properties, and more preferably is optically transparent.

The substrate 10 may be composed of two or more materials. The substrate 10 may also have a single-layer structure or a multilayer structure. For example, the substrate 10 may have a core formed of a metal material and a shell formed of an insulating material to thereby exhibit non-conductivity. Examples include silicon with an insulating film; and a metal (such as aluminum, copper, chromium, or a composite thereof) with an insulating film.

In one embodiment, the plating solution 60 can be prepared by mixing a metal cation solution containing the metal cation and a reducing agent solution containing a reducing agent.

The metal cation solution containing the metal cation usually contains the metal cation and a solvent. The metal-based particle assembly layer formed on the substrate 10 is preferably a plasmonic structure, as described below. From this viewpoint, the metal species of the metal cation is preferably a material with which the metal-based particles can be deposited onto the substrate 10 by the treatment of reducing the metal cation with the substrate 10 being brought into contact with the plating solution 60, and exhibits a plasmon resonance peak (hereinafter also referred to as a "plasmon peak") appearing in the ultraviolet to visible light region in absorption spectrum measurement by absorptiometry (a material capable of exhibiting plasmon resonance). Examples of such metals include noble metals, such as gold, silver, copper, platinum, and palladium; other metals, such as aluminum; and alloys containing the noble metals or other metals. Preferred among these are noble metals, such as gold, silver, copper, platinum, and palladium, and more preferred is silver, because it is inexpensive and has small absorption (or has a small imaginary part of the dielectric function at visible light wavelengths). The plating solution 60 may contain two or more types of metal cations.

The solvent contained in the metal cation solution is preferably a solvent capable of dissolving a corresponding metal salt contained as a metal cation source in the metal cation solution, for example, water. The metal cation solution may contain two or more solvents. The solvent may include, for example, water and an organic solvent (for example, an alcohol) miscible with water.

The metal cation concentration in the plating solution 60 is preferably 0.0008 mol/L or more, more preferably 0.002 mol/L or more, still more preferably 0.0035 mol/L or more, even more preferably 0.006 mol/L or more, and particularly preferably 0.01 mol/L or more. When the metal cation concentration falls in the above-mentioned range, the metal-based particles can be grown at a moderate rate, which facilitates forming the metal-based particle assembly layer with a preferred shape (average particle diameter, average height, average interparticle distance and standard deviation thereof) in a satisfactorily controlled manner. The preferred shape of the metal-based particle assembly layer will be described in detail below. Moreover, when the metal cation concentration falls in the above-mentioned range, a sufficient amount of the metal-based particles can be easily formed on the entire surface of each particle when forming the metal-based particle assembly layer by immersing particles (powder) used as the substrates 10 in the plating solution 60. To adjust the growth rate of the metal-based particles to a moderate rate, the metal cation concentration in the plating solution 60 is preferably 0.4 mol/L or less, more preferably 0.3 mol/L or less, still more preferably 0.15 mol/L or less, and even more preferably 0.05 mol/L or less.

In the metal-based particle assembly layer formation step, a $V_S/V_L$ ratio of volume $V_S$ [cm$^3$] of the substrate 10 to volume $V_L$ [cm$^3$] of the plating solution 60 is 0.03 or less. This allows the metal-based particle assembly layer containing the plurality of metal-based particles arranged apart from each other to be formed on the surface of the substrate 10. If the ratio is above 0.03, a continuous metal film will be formed on the substrate 10, and it will be difficult to form the metal-based particle assembly layer. In view of facilitating forming the metal-based particle assembly layer, and facilitating forming the metal-based particle assembly layer with a preferred shape in a satisfactorily controlled manner, the ratio is preferably 0.020 or less, more preferably 0.010 or less, still more preferably 0.005 or less, even more preferably 0.003 or less, and particularly preferably 0.002 or less. In view of mass productivity and the like of the layered product, the ratio is usually 0.00001 or more, and may be 0.0001 or more, preferably 0.0005 or more, and more preferably above 0.0005.

For example, when the substrate 10 is a particle, the volume $V_S$ of the substrate 10 can be obtained by dividing the total particle weight by the particle density.

The plating solution 60 preferably contains the metal cation as well as a reducing agent capable of reducing the metal cation to a zero-valent metal. When the plating solution 60 contains a reducing agent, the reducing agent is preferably added into the plating solution 60 immediately before the substrate 10 is immersed in the plating solution 60. For example, as described above, the plating solution 60 containing the metal cation and the reducing agent can be prepared by mixing a metal cation solution containing the metal cation and a reducing agent solution containing a reducing agent. The reducing agent solution is a solution containing a reducing agent and a solvent, preferably a solution in which the reducing agent is dissolved in the solvent. The solvent contained in the reducing agent solution is preferably a solvent capable of dissolving the reducing agent, for example, water. The reducing agent solution may contain two or more solvents. The solvent may include, for example, water and an organic solvent (for example, an alcohol) miscible with water.

The reducing agent is preferably a reducing agent with a low reducing power, with a standard redox potential of preferably −0.5 V or more, more preferably −0.45 V or more. As used herein, the standard redox potential refers to the value obtained when using a standard hydrogen electrode as the cathode at pH 7 and 25° C. When the standard redox potential of the reducing agent used falls in the above-mentioned range, the metal-based particles can be grown at a moderate rate, which facilitates forming the metal-based particle assembly layer. The above-mentioned range of the standard redox potential is also advantageous in facilitating forming the metal-based particle assembly layer with a preferred shape in a satisfactorily controlled manner. If the reducing power of the reducing agent is excessively high, the growth rate of the metal-based particles will be excessively high, and a continuous metal film is likely to be formed.

Examples of reducing agents with a standard redox potential of −0.5 V or more include glucose and ascorbic acid. The plating solution 60 may contain two or more reducing agents.

The concentration of the reducing agent in the plating solution 60 is preferably 1 mol/L or less, more preferably 0.8 mol/L or less, still more preferably 0.4 mol/L or less, even more preferably 0.3 mol/L or less, and particularly preferably 0.25 mol/L or less. When the concentration of the reducing agent falls in the above-mentioned range, the metal-based particles can be grown at a moderate rate, which facilitates forming the metal-based particle assembly layer with a preferred shape. To adjust the growth rate of the metal-based particles to a moderate rate, the concentration of the reducing agent in the plating solution 60 is preferably 0.000001 mol/L or more, more preferably 0.000005 mol/L or more, still more preferably 0.000008 mol/L or more, even more preferably 0.00001 mol/L or more, and particularly preferably 0.0008 mol/L or more.

The ratio in percent of the concentration of the reducing agent in the plating solution 60 to the saturation concentration of the reducing agent in the plating solution 60 is preferably 8% or less, more preferably 4% or less, still more preferably 2% or less, even more preferably 1% or less, and particularly preferably 0.8% or less. When the ratio falls in the above-mentioned range, the metal-based particles can be grown at a moderate rate, which facilitates forming the metal-based particle assembly layer with a preferred shape in a satisfactorily controlled manner. To adjust the growth rate of the metal-based particles to a moderate rate, the ratio is preferably 0.0005% or more, more preferably 0.001% or more, still more preferably 0.003% or more, even more preferably 0.005% or more, and particularly preferably 0.01% or more. If the ratio is excessively high, it will be difficult to control the shape of the metal-based particle assembly layer, and a continuous metal film is likely to be formed.

The saturation concentration of the reducing agent in the plating solution 60 is the saturation concentration when the reducing agent is dissolved in the solvent (not containing the metal cation) contained in the plating solution 60 at the temperature at which the treatment of immersing the substrate 10 in the plating solution 60 is performed.

The plating solution 60 may contain one or more complexing agents that bind to the metal cation to form a complex ion and stabilize the metal cation, and one or more other additives. Examples of such complexing agents include amine-based complexing agents, such as ethylenediamine, ethylenediaminetetraacetic acid, tetrasodium ethylenediaminetetraacetate, and triethylenetetraminehexaacetic acid, ammonia, nitrotriacetic acid, sodium thiosulfate, succinic acid salts, succinimide, and citric acid salts or iodide salts. In view of adjusting the growth rate of the metal-based particles to a moderate rate, the complexing agent is preferably an amine-based complexing agent or ammonia, more preferably an amine-based complexing agent, and still more preferably ethylenediamine or the like. When preparing the plating solution 60 by mixing a metal cation solution and a reducing agent solution, the complexing agent may be previously added to the metal cation solution.

The treatment for forming the metal-based particle assembly layer comprising the plurality of metal-based particles 20 on the substrate 10 by immersing the substrate 10 in the plating solution 60 can basically be performed in the same manner as electroless plating (chemical plating) using a plating bath. The temperature at which the substrate 10 is immersed in the plating solution 60 is not limited to a particular temperature, and is, for example, 10° C. or more and 100° C. or less, preferably 15° C. or more and 60° C. or less, and more preferably 20° C. or more and 40° C. or less.

In view of facilitating forming the metal-based particle assembly layer and not a continuous metal film, and facilitating forming the metal-based particle assembly layer with a preferred shape in a satisfactorily controlled manner, it is preferred to adjust the growth rate of the metal-based particles to a moderate rate. Specifically, in the metal-based particle assembly layer formation step, the average height growth rate of the metal-based particles at 28 minutes from the start of deposition of the metal onto the three-dimensional surface of the substrate 10 is preferably 6 nm/min or less, more preferably 5 nm/min or less, still more preferably 4 nm/min or less, and even more preferably 3.5 nm/min or less. When the ratio $V_S/V_L$ falls in the above-described range, the average height growth rate at 28 minutes from the start of deposition of the metal can be easily controlled in the above-mentioned range. In view of mass productivity and the like of the layered product, the average height growth rate is usually 1 nm/min or more, and preferably 2 nm/min or more.

The average height growth rate of the metal-based particles at 28 minutes from the start of deposition of the metal onto the three-dimensional surface of the substrate 10 can be measured by, for example, previously performing, as a preliminary experiment, the same metal-based particle assembly layer formation step except that the reaction is terminated (for example, filtered off) at 28 minutes, and measuring the average height growth rate from an average height obtained in the preliminary experiment.

The phrase "start of deposition of the metal onto the three-dimensional surface of the substrate 10" means the start of immersion of the substrate 10 when the metal-based particle layer formation step is initiated by immersing the substrate 10 in the plating solution 60 containing the metal cation and a reducing agent, or means the time of addition of reducing agent when the substrate 10 is immersed in a metal cation solution containing the metal cation, and then a reducing agent (for example, a reducing agent solution) is added.

In view of facilitating forming the metal-based particle assembly layer and not a continuous metal film, and facilitating forming the metal-based particle assembly layer with a preferred shape in a satisfactorily controlled manner, the metal-based particle assembly layer formation step when the substrate 10 is a particle preferably satisfies the following expression (1):

$$10 \times 10^{-7} \leq X \leq 600 \times 10^{-7} \tag{1}$$

When the ratio $V_S/V_L$ falls in the above-described range, the value of X can be easily controlled in the above-mentioned range. The value of X is more preferably $30 \times 10^{-7}$ or more and $450 \times 10^{-7}$ or less, and still more preferably $40 \times 10^{-7}$ or more and $300 \times 10^{-7}$ or less.

When the particle is spherical, X is represented by the following expression:

$$X = \left(\frac{3aVD}{4\pi BC} + R^3\right)^{\frac{1}{3}} - R \qquad \text{[Expression 1]}$$

wherein a represents the metal cation concentration (mol/L) in the plating solution 60; V represents the volume (L) of the plating solution 60; D represents the atomic weight of the metal (zero-valent) produced by reduction of the metal cation; B represents the particle number (particles) of the substrate 10; C represents the specific gravity (g/cm³) of the metal (zero-valent) produced by reduction of the metal cation; and R represents the radius (cm) of the particle serving as the substrate 10.

When the particle has an irregular shape, X is represented by the following expression:

$$X = \frac{aVD}{SC} \qquad \text{[Expression 2]}$$

wherein a, V, D, and C represent the same meanings as set forth above; and S represents a sum total of surface areas of the particle serving as the substrate 10.

The particle number B of the substrate 10 can be obtained from the total weight $m_p$ of the particle and the density $V_p$ of the particle, according to the following expression:

$$B = \frac{3V_p}{4\pi R^3 m_p} \qquad \text{[Expression 3]}$$

wherein R represents the same meaning as set forth above. The radius R (cm) of the particle is half the average particle diameter of the particles obtained as described above.

The sum total S of surface areas of the particle can be obtained by measuring the specific surface area by the BET method, and multiplying the result by the total weight $m_p$ of the particle.

The phrase "the particle serving as the substrate 10 is spherical" means that the particle has the following shape: A SEM image is obtained in the same manner as above, and, in all 10 particles adopted, all five tangential diameters adopted are ±30% of the average tangential diameter (i.e., the average particle diameter of the particles serving as the substrates 10×70% or more and 130% or less). "Amorphous" refers to shapes that are not spherical.

The method for producing a layered product according to the present invention allows the metal-based particle assembly layer comprising the plurality of metal-based particles 20 to be formed on the three-dimensional surface of the substrate 10 in a satisfactorily controlled manner, and further allows the metal-based particle assembly layer with a preferred shape to be formed on the three-dimensional surface of the substrate 10 in a satisfactorily controlled manner. Moreover, the method for producing a layered product according to the present invention facilitates forming the metal-based particle assembly layer over the entire surface of the substrate 10. Furthermore, the method for producing a layered product according to the present invention can improve mass productivity of the layered product production.

The time of the metal-based particle assembly layer formation step, i.e., the time in which the substrate 10 is immersed in the plating solution 60 to grow the metal-based particles 20, is preferably appropriately controlled. If the time is excessively long, the metal-based particle assembly layer comprising the plurality of metal-based particles 20 will not be formed, and instead, a continuous metal film will be formed. The longer the time, the larger the average particle diameter and average height of the metal-based particles tends to be, and the smaller the average interparticle distance tends to be. The appropriate time of the metal-based particle assembly layer formation step is preferably previously known from a preliminary experiment before the metal-based particle assembly layer formation step is actually performed.

(2) Metal-Based Particle Assembly Layer Formed by Metal-Based Particle Assembly Layer Formation Step By the metal-based particle assembly layer formation step, the metal-based particle assembly layer comprising the plurality of metal-based particles arranged apart from each other is formed on the three-dimensional surface of the substrate 10.

The metal-based particle assembly layer formed on the substrate 10 is preferably a plasmonic structure. "Plasmonic structure" refers to a structure capable of exhibiting localized plasmon resonance. Plasmon is a compressional wave of free electrons generated by collective oscillation of the free electrons in a structure.

Because of the localized plasmon resonance, the layered product comprising a plasmonic structure can enhance, for example, the intensity of emission (for example, fluorescence) from a luminescent substance that labels an analyte. Thus, the layered product comprising a plasmonic structure is suitable for use as an emission enhancing element for various sensor elements. By applying the layered product to a sensor element, the sensitivity, quantitative accuracy and/or reproducibility (stability) of quantitative results of the sensor element can be improved. One suitable example of the sensor element is a biosensor element.

The layered product comprising a plasmonic structure can exhibit the following characteristics [a] and [b]. These characteristics are believed to be achieved by interactions between localized plasmons exhibited by the plurality of metal-based particles constituting the metal-based particle assembly layer.

[a] The range of the effect of plasmon resonance (the range where the emission enhancing effect of plasmon is effective) exhibited by the metal-based particle assembly layer is broad, and even the emission from the luminescent substance present in the range of, for example, several hundred nm (for example, 200 nm) from the surface of the metal-based particle assembly layer can be enhanced.

[b] The metal-based particle assembly layer exhibits intense plasmon resonance, and hence, a high emission enhancing effect can be achieved.

Regarding the characteristic [a], the layered product comprising a plasmonic structure can enhance the emission of the luminescent substance arranged at a position, for example, 10 nm or more away, further several ten nm (for example 20 nm, 30 nm or 40 nm) or more away, and still further 100 nm or more, or 200 nm or more away, from the metal-based particle assembly layer. Regarding the characteristic [b], the intensity of plasmon resonance exhibited by the layered product comprising a plasmonic structure is not that of a simple sum total of localized plasmon resonances exhibited by the individual metal-based particles at a specific wavelength, but rather, is higher than that. In the layered product comprising a plasmonic structure, intense plasmon resonance is achieved by interactions of the individual metal-based particles with each other. This intense plasmon resonance is believed to be achieved by interactions between localized plasmons of the metal-based particles.

In general, when a plasmonic structure is subjected to absorption spectrum measurement by absorptiometry, a plasmon resonance peak (a plasmon peak) is observed as a peak at the longest wavelength in the ultraviolet to visible light region. The intensity of the plasmon resonance of the plasmonic structure can be evaluated based on the magnitude of the absorbance at the maximum wavelength of the plasmon peak. The larger the value of absorbance, the higher the intensity of the plasmon resonance tends to be.

The absorption spectrum of the plasmonic structure can be measured by absorptiometry. Specifically, the absorption spectrum is obtained as follows: Incident light in the ultraviolet to visible light region is directed from the back surface side of the glass substrate layered with the metal-based particle assembly (i.e., the side opposite to the metal-based particle assembly) in a direction perpendicular to the substrate surface, and intensity I of the transmitted light omnidirectionally transmitted toward the metal-based particle assembly is measured with an integrating sphere spectrophotometer. On the other hand, the same incident light as described above is directed in a direction perpendicular to the surface of a substrate not layered with the metal-based particle assembly, which has the same thickness and the same material as those of the substrate of the measurement sample, and intensity $I_0$ of transmitted light omnidirectionally transmitted through the side opposite to the incident surface is measured with the integrating sphere spectrophotometer. In this case, the absorbance along the vertical axis in the absorption spectrum is represented by the following expression:

$$\text{Absorbance} = -\log_{10}(I/I_0)$$

The absorption spectrum can be measured using a common spectrophotometer.

To measure the maximum wavelength and the absorbance at the maximum wavelength of the plasmon peak at the longest wavelength in the ultraviolet to visible light region, absorption spectrum measurement may be performed using an objective lens and a spectrophotometer to narrow the field of view.

The plurality of metal-based particles constituting the metal-based particle assembly layer may have an average particle diameter of 5 nm or more, preferably 30 nm or more, more preferably 100 nm or more, still more preferably 200 nm or more, even more preferably 250 nm or more, in view of effectively achieving the above-described effects [a] and [b]. The plurality of metal-based particles constituting the metal-based particle assembly layer may have an average particle diameter of, for example, 1600 nm or less, preferably 800 nm or less, more preferably 550 nm or less, still more preferably 450 nm or less, even more preferably 400 nm or less, particularly preferably 350 nm or less, in view of effectively achieving the above-described effects [a] and [b].

The average particle diameter of the metal-based particles is preferably selected appropriately according to the type of metal-based material constituting the metal-based particles.

The average particle diameter of the plurality of metal-based particles refers to the average value of the particle diameter obtained as follows: In a SEM image including a layered product as observed from directly above a substrate (such as a glass substrate) to which the layered product is adhered, six metal-based particles are selected at random. In each metal-based particle image, five tangential diameters are drawn at random (note that all the straight lines serving as the tangential diameters can pass through only the inside of the metal-based particle image, and one of these lines is a straight line that passes through only the inside of the metal-based particle and can be drawn the longest). When the average value thereof (this average value is hereinafter also referred to as the "average tangential diameter") is obtained as the particle diameter of each metal-based particle, the average particle diameter of the plurality of metal-based particles is the average value of the particle diameters for the six selected metal-based particles. The tangential diameter is defined as set forth above.

The method of measuring the average particle diameter is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 6 random numbers ($x_1$, $x_2$, $x_3$, $x_4$, $x_5$, and $x_6$) from 1 to 1280 and 6 random numbers ($y_1$, $y_2$, $y_3$, $y_4$, $y_5$, and $y_6$) from 1 to 960. From the respective sets of 6 random numbers thus obtained, 6 sets of random number combinations ($x_1$, $y_1$), ($x_2$, $y_2$), ($x_3$, $y_3$), ($x_4$, $y_4$), ($x_5$, $y_5$), and ($x_6$, $y_6$) are obtained. Using the values of the random numbers generated from 1 to 1280 as x-coordinates and the values of the random numbers generated from 1 to 960 as y-coordinates, 6 sets of coordinate points ($x_1$, $y_1$), ($x_2$, $y_2$), ($x_3$, $y_3$), ($x_4$, $y_4$) ($x_5$, $y_5$), and ($x_6$, $y_6$) are obtained. Then, for each of the total of six metal-based particle images including the coordinate points, the above-described average tangential diameter is obtained, and then the average particle diameter is obtained as the average value of the average tangential diameters for the six metal-based particles. Here, if at least any one of the six coordinate points that are the six sets of random number combinations is not included in a metal-based particle image, or if two or more coordinate points are included in an identical metal-based particle, then these random number combinations are discarded, and random number generation is repeated until all the six coordinate points are included in different metal-based particle images. Here, "edge region" in the particle serving as the substrate described above is also obtained from the same image. Then, if any metal-based particle of the six metal-based particles overlaps even partially with the edge region in the particle serving as the substrate on which each of the metal-based particles is arranged, the random number combinations are discarded, and random number generation is repeated until all the six coordinate points are included in different metal-based particle images, and there is no metal-based particle that overlaps even partially with the edge region in the particle serving as the substrate on which each of the metal-based particles is arranged. The average tangential diameter is then obtained in the same manner as above. This procedure is repeated as required to obtain average tangential diameters for six metal-based particles that do not overlap with the edge region in the particle serving as the substrate. The average value of the six average tangential diameters thus obtained is obtained as the average particle diameter.

Usually, the average particle diameter of the metal-based particles is smaller than the particle diameter of the particle serving as the substrate on which they are supported. The ratio of the particle diameter of the particle serving as the substrate to the average particle diameter of the metal-based particles is, for example, 2 or more and 10000 or less, preferably 4 or more and 5000 or less, and more preferably 6 or more and 1000 or less.

In view of effectively achieving the above-described effects [a] and [b], in the metal-based particle assembly layer, the plurality of metal-based particles are preferably each arranged so that an average distance between metal-based particles adjacent to each other (hereinafter also referred to as the "average interparticle distance") is 1 nm or more and 150 nm or less. When the plurality of metal-based particles are arranged at this average interparticle distance, intense plasmon resonance can be obtained and simultaneously, the effect of extending the range of the effect of plasmon resonance can be increased.

The average interparticle distance is preferably 1 nm or more and 120 nm or less, more preferably 1 nm or more and 100 nm or less, still more preferably 1 nm or more and 80 nm or less, particularly preferably 1 nm or more and 60 nm or less, and most preferably 1 nm or more and 40 nm or less, in view of effectively achieving the above-described effects [a] and [b]. If the average interparticle distance is less than 1 nm, electron transfer between the particles attributed to the Dexter mechanism occurs, which disadvantageously deactivates localized plasmon.

The average interparticle distance is obtained as follows: In a SEM image including a layered product as observed from directly above a substrate (such as a glass substrate) to which the layered product is adhered, six metal-based particles are selected at random, and for each selected metal-based particle, an interparticle distance from an adjacent metal-based particle is obtained, and the average value of interparticle distances of these six metal-based particles is obtained as the average interparticle distance. The interparticle distance from an adjacent metal-based particle is obtained as follows: A distance from every adjacent metal-based particle (minimum distance between the surfaces of adjacent metal-based particles) is measured, and such measurements are averaged to obtain the interparticle distance from an adjacent metal-based particle.

The method of measuring the average interparticle distance is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 6 random numbers ($x_1$ to $x_6$) from 1 to 1280 and 6 random numbers ($y_1$ to $y_6$) from 1 to 960. From the respective sets of 6 random numbers thus obtained, 6 sets of random number combinations ($x_1$, $y_1$) to ($x_6$, $y_6$) are obtained. Using the values of the random numbers generated from 1 to 1280 as x-coordinates and the values of the random numbers generated from 1 to 960 as y-coordinates, 6 sets of coordinate points ($x_1$, $y_1$) to ($x_6$, $y_6$) are obtained. Then, for each of the total of 6 metal-based particle images including the coordinate points, an interparticle distance from a metal-based particle adjacent to that metal-based particle is obtained, and then the average interparticle distance is obtained as the average value of interparticle distances from adjacent metal-based particles for the 6 metal-based particles. Here, if at least any one of the six coordinate points that are the six sets of random number combinations is not included in a metal-based particle image, or if two or more coordinate points are included in an identical metal-based particle, then these random number combinations are discarded, and random number generation is repeated until all the six coordinate points are included in different metal-based particle images. Here, "edge region" in the particle serving as the substrate described above is also obtained from the same image. Then, if any metal-based particle of the six metal-based particles overlaps even partially with the edge region in the particle serving as the substrate on which each of the metal-based particles is arranged, the random number combinations are discarded, and random number generation is repeated until all the six coordinate points are included in different metal-based particle images, and there is no metal-based particle that overlaps even partially with the edge region in the particle serving as the substrate on which each of the metal-based particles is arranged. The interparticle distance is then obtained in the same manner as above. This procedure is repeated as required to obtain interparticle distances for six metal-based particles that do not overlap with the edge region in the particle serving as the substrate. The average value of the interparticle distances of the six metal-based particles thus obtained is obtained as the average interparticle distance.

In the metal-based particle assembly layer, the plurality of metal-based particles are preferably arranged so that a standard deviation of the average interparticle distance is 50 nm or less, in view of effectively achieving the above-described effects [a] and [b]. When the metal-based particles are arranged so that the standard deviation falls in this range, intense plasmon resonance can be obtained and simultaneously, the effect of extending the range of the effect of plasmon resonance can be increased.

The standard deviation of the average interparticle distance is more preferably 40 nm or less, still more preferably 30 nm or less, even more preferably 25 nm or less, and particularly preferably 20 nm or less, in view of effectively achieving the above-described effects [a] and [b]. The standard deviation of the average interparticle distance is preferably 0.1 nm or more, more preferably 0.2 nm or more, and still more preferably 0.3 nm or more, in view of effectively achieving the above-described effects [a] and [b].

The standard deviation of the average interparticle distance is defined as follows: In a SEM image including a layered product as observed from directly above a substrate (such as a glass substrate) to which the layered product is adhered, one metal-based particle is initially selected at random, and for that metal-based particle, an interparticle distance from an adjacent metal-based particle is obtained. A distance from every adjacent metal-based particle (minimum distance between their surfaces) is measured, and such measurements are averaged to obtain the interparticle distance from an adjacent metal-based particle. In the above-described SEM image, 5 metal-based particles different from the above-described one metal-based particle are selected at random, and interparticle distances from adjacent metal-based particles are obtained for these 5 metal-based particles in the same manner as above. The standard deviation of the interparticle distances from adjacent metal-based particles for the total of 6 metal-based particles thus obtained is defined as the standard deviation of the average interparticle distance.

The method of measuring the standard deviation of the average interparticle distance is more specifically described as follows: Initially, the scanning electron microscope "JSM-5500" produced by JEOL Ltd. or its equivalent is used to measure a SEM image. Then, the free image processing software "ImageJ" produced by U.S. National Institutes of Health is used to read in the obtained image at 1280 horizontal pixels×960 vertical pixels. Then, the random number generator function "RANDBETWEEN" of the spreadsheet software "Excel" produced by Microsoft Corporation is used to obtain 6 random numbers ($x_1$ to $x_6$) from 1 to 1280 and 6 random numbers ($y_1$ to $y_6$) from 1 to 960. From the respective sets of 6 random numbers thus obtained, 6 sets of random number combinations ($x_1$, $y_1$) to ($x_6$, $y_6$) are obtained. Using the values of the random numbers generated from 1 to 1280 as x-coordinates and the values of the random numbers generated from 1 to 960 as y-coordinates, 6 sets of coordinate points ($x_1$, $y_1$) to ($x_6$, $y_6$) are obtained. Then, for each of the total of 6 metal-based particle images including the coordinate points, an interparticle distance from a metal-based particle adjacent to that metal-based particle is obtained, and then the standard deviation of the average interparticle distance is obtained as the standard deviation of interparticle distances from adjacent metal-based particles for the 6 metal-based particles. Here, if at least any one of the six coordinate points that are the six sets of random number combinations is not included in a metal-based particle image, or if two or more coordinate points are included in an identical metal-based particle, then these random number combinations are discarded, and random number generation is repeated until all the six coordinate points are included in different metal-based particle images. Here, "edge region" in the particle serving as the substrate described above is also obtained from the same image. Then, if any metal-based particle of the six metal-based particles overlaps even partially with the edge region in the particle serving as the substrate on which each of the metal-based particles is arranged, the random number combinations are discarded, and random number generation is repeated until all the six coordinate points are included in different metal-based particle images, and there is no metal-based particle that overlaps even partially with the edge region in the particle serving as the substrate on which each of the metal-based particles is arranged. The interparticle distance is then obtained in the same manner as above. This procedure is repeated as required to obtain interparticle distances for six metal-based particles that do not overlap with the edge region in the particle serving as the substrate. The standard deviation of the average interparticle distance is obtained as the standard deviation of interparticle distances from adjacent metal-based particles for the six metal-based particles.

When the metal-based particle assembly layer cannot be observed by SEM observation, such as when the layered product has the below-described protective layer, TEM (transmission electron microscope) observation may be performed instead, for measuring the average particle diameter, the average interparticle distance and the standard deviation thereof of the metal-based particle assembly layer.

The plurality of metal-based particles constituting the metal-based particle assembly layer preferably have an average height of 5 nm or more and 500 nm or less, more preferably 10 nm or more and 300 nm or less, still more preferably 30 nm or more and 200 nm or less, even more preferably 50 nm or more and 150 nm or less, particularly preferably 55 nm or more and 150 nm or less, in view of effectively achieving the above-described effects [a] and [b].

The average height of the plurality of metal-based particles is measured according to the following method: The scanning electron microscope "JSM-5500" produced by JEOL Ltd. or its equivalent is used to obtain a cross-sectional image of the layered product. In the obtained cross-sectional image, 10 points are selected at random on an outer contour surface of the layered product formed of the substrate and the metal-based particle assembly layer (the layered product not having the protective layer). Then, a straight line is drawn to be shortest from each of the 10 points to an outer surface of the substrate, and the average value of the lengths of the 10 straight lines thus obtained is obtained as the average height of the metal-based particles.

The plurality of metal-based particles constituting the metal-based particle assembly layer preferably have an aspect ratio of 1 or more and 8 or less, more preferably 1 or more and 7 or less, still more preferably 1.5 or more and 7 or less, even more preferably 1.5 or more and 6 or less, in view of effectively achieving the above-described effects [a] and [b].

The aspect ratio is defined as the ratio of the above-described average particle diameter to the above-described average height (i.e., average particle diameter/average height). While the metal-based particles may have a spherical shape, they preferably have a flat shape with an aspect ratio of above 1, in view of effectively achieving the above-described effects [a] and [b].

The metal-based particles preferably have a smooth curved surface, and particularly preferably have a flat shape whose surface is a smooth curved surface, in view of exciting highly effective plasmon. However, the metal-based particles may have some minute recesses and projections (roughness) on the surface, and may in that sense have an amorphous shape.

The method for producing a layered product according to the present invention is suitable as a method for forming, on the substrate 10, the metal-based particle assembly layer in which the average particle diameter, the average height, the aspect ratio, the average interparticle distance and the standard deviation thereof, and the like fall in the above-described preferred ranges.

For a single layered product, the number of the metal-based particles contained in the metal-based particle assembly layer is usually 6 or more, and preferably 30 or more. When the metal-based particle assembly layer is formed to contain six or more metal-based particles, intense plasmon resonance and an extended range of the effect of plasmon resonance can be easily achieved because of interactions between localized plasmons of the metal-based particles. For a single layered product, the number of the metal-based particles contained in the metal-based particle assembly layer may be, for example, 50 or more, further 1000 or more, and still further 10000 or more.

The metal-based particles preferably have a number density of 7 or more, more preferably 15 or more, per $\mu m^2$ of surface area of the substrate, in view of facilitating achieving intense plasmon resonance and an extended range of the effect of plasmon resonance.

The layered product in which the metal-based particle assembly layer is arranged on the surface of the substrate and the layered product in which the below-described protective layer is further arranged on the surface of the layered product may have surface recesses and projections. The layered product with surface recesses and projections has a larger surface area. Thus, when the layered product is applied to a sensor element, a larger amount of the analyte can be bound to the surface of the layered product. This is advantageous for improving the detection sensitivity and detection accuracy of the sensor element.

The metal-based particle assembly layer is preferably non-conductive as a layer, in view of facilitating achieving intense plasmon resonance and an extended range of the effect of plasmon resonance. From this viewpoint, the surface of the substrate on which the metal-based particles are arranged is preferably also non-conductive. The metal-based particles themselves may be conductive.

(3) Step of Forming Protective Layer

The method for producing a layered product may further comprise the step of forming a protective layer comprising an insulating material on the metal-based particle assembly layer. FIG. 4 is a cross-sectional view schematically showing another example of the layered product. A layered product 2 shown in FIG. 4 comprises a substrate 10 having a three-dimensional surface (core particle), a metal-based particle assembly layer arranged on at least a portion (preferably the entire surface) of the three-dimensional surface of the substrate 10, and a protective layer 30 that covers at least surfaces of the plurality of metal-based particles 20. The protective layer is preferably formed to cover at least surfaces of the plurality of metal-based particles on the surface of the substrate.

Formation of the protective layer is advantageous in the following respects:

[A] When the layered product is used as an emission enhancing element to enhance the intensity of emission from a luminescent substance that labels the analyte, if the luminescent substance is in direct contact with the metal-based particles of the layered product, quenching due to electron tunneling from the luminescent substance to the metal-based particles may occur, resulting in a decrease in the enhancement effect. The protective layer provided on the metal-based particles ensures that the luminescent substance and the metal-based particles are spaced apart, which can inhibit quenching.

[B] The stability (such as oxidation resistance) and environmental stability (for example, light resistance, humidity resistance, and heat resistance) of the layered product (the substrate and/or the metal-based particles) can be increased.

From the viewpoint of [A] above, the protective layer may be formed to cover at least the surfaces of the plurality of the metal-based particles constituting the metal-based particle assembly layer; however, as shown in FIG. 4, the protective layer may also be formed to cover an entire surface including the surface of the substrate and the surfaces of the plurality of metal-based particles.

From the viewpoint of [A] above, the material of the protective layer is preferably a non-conductive material, i.e., an insulating material. Examples of the insulating material include inorganic insulating materials, such as $SiO_2$, SiN, $TiO_2$, $Al_2O_3$, and $Si_3N_4$; and organic insulating materials, such as resin materials (for example, polystyrene, acrylic resin, and epoxy resin). The protective layer may be composed of two or more materials. The protective layer may have a single-layer structure or a multilayer structure.

While the thickness of the protective layer is not limited to a particular thickness, it is, for example, 3 nm or more, and preferably 10 nm or more. When the layered product is used as an emission enhancing element in a sensor element for capturing an analyte labeled with a luminescent substance onto the protective layer and analyzing the analyte, the thickness of the protective layer is, for example, 300 nm or less, preferably 200 nm or less, more preferably 150 nm or less, still more preferably 100 nm or less, and even more preferably 80 nm or less, in view of effectively enhancing the emission from the luminescent substance.

The thickness of the protective layer is measured according to the following method: The scanning electron microscope "JSM-5500" produced by JEOL Ltd. or its equivalent is used to obtain a cross-sectional image of the layered product. In the obtained cross-sectional image, 10 points are selected at random on an outer contour surface of the layered product formed of the substrate and the metal-based particle assembly layer (the layered product not having the protective layer). These points are on the surfaces of the metal-based particles, which surfaces form an interface with the protective layer. Then, a straight line is drawn to be shortest from each of the 10 points to an outer surface of the protective layer, and the average value of the lengths of the 10 straight lines thus obtained is obtained as the thickness of the protective layer.

In the layered product according to one preferred embodiment, the protective layer covers the entire surface of the particle formed of the substrate and the metal-based particle assembly layer (the layered product not having the protective layer). In this embodiment, the outer surface of the protective layer may have recesses and projections following the surface recesses and projections of the layered product not having the protective layer (recesses and projections based on the metal-based particles), or the outer surface of the protective layer may be smooth without recesses and projections. FIG. 4 shows an example in which the protective layer has surface recesses and projections. When the layered product is applied to a sensor element, the protective layer preferably has surface recesses and projections, in view of increasing the amount of the analyte bound to the surface of the layered product.

When the protective layer covers the entire surface of the layered product not having the protective layer, the protective layer may be formed with a relatively uniform thickness over the entire surface or may be formed with a nonuniform thickness, such as thicker or thinner in local regions. When the layered product is used as an emission enhancing element in a sensor element for capturing an analyte labeled with a luminescent substance onto the protective layer and analyzing the analyte, the protective layer is preferably formed with a uniform or relatively uniform thickness over the entire surface, in view of minimizing variations in the distance from the metal-based particle assembly layer to the luminescent substance depending on the position of the layered product surface where the analyte labeled with the luminescent substance is captured.

Examples of the method for producing a layered product comprising the step of forming a protective layer on the metal-based particle assembly layer include the following methods:

[a] a method in which a protective layer is formed using the below-described sol-gel method, after the metal-based particle assembly layer formation step described in (1) above is performed;

[b] a method in which a protective layer is formed using methods other than the below-described sol-gel method (for example, a sputtering method (which may be powder sputtering), a vapor deposition method (which may be powder vapor deposition), and CVD (which may be powder CVD)), after the metal-based particle assembly layer formation step described in (1) above is performed;

[c] a method in which a protective layer is formed using the below-described sol-gel method, after the metal-based particle assembly layer is formed using methods other than the metal-based particle assembly layer formation step described in (1) above (for example, a sputtering method and a vapor deposition method (such as vacuum deposition)); and

[d] a method in which a protective layer is formed using methods other than the below-described sol-gel method (for example, a sputtering method (which may be powder sputtering), a vapor deposition method (which may be powder vapor deposition), and CVD (which may be powder CVD)), after the metal-based particle assembly layer is formed using methods other than the metal-based particle assembly layer formation step described in (1) above (for example, a sputtering method and a vapor deposition method (such as vacuum deposition)).

A suitable example of the method of forming a protective layer comprising an insulating material on the metal-based particle assembly layer is the above-described sol-gel method. The sol-gel method is a method that starts from a solution containing a metal alkoxide or the like as a raw material, and involves the hydrolysis reaction and polymerization reaction, leading to a corresponding metal oxide. One example of the sol-gel method is the Stober method ("o" in "Stober" means the umlaut of "o"; the same applies hereinafter). With this method, silica ($SiO_2$) can be produced by using tetraethyl orthosilicate as a raw material, and performing the reaction in an ethanol solvent in the presence of water and ammonia as a catalyst. For the Stober method, reference may be made to W. Stober and A. Fink, Journal of Colloid and Interface Science 26(1), 62-69 (1968).

With the Stober method, a $SiO_2$ layer can be formed as a protective layer on the layered product formed of the substrate and the metal-based particle assembly layer. Specifically, a $SiO_2$ layer can be formed on the layered product, by performing the above-mentioned reaction of tetraethyl orthosilicate or the like as a raw material in a solution containing a solvent such as an alcohol, water, and ammonia as a catalyst, in the presence of the layered product formed of the substrate and the metal-based particle assembly layer.

While the temperature of the above-mentioned reaction may be selected as appropriate, it is, for example, 0° C. or more and 100° C. or less, and preferably 10° C. or more and 60° C. or less. During the reaction, the reaction solution may be subjected to an ultrasonic treatment, which facilitates forming a uniform coating with the protective layer.

The thickness of the protective layer depends on the amount of raw material (such as a metal alkoxide) relative to the layered product formed of the substrate and the metal-based particle assembly layer in the reaction solution. A $V_G/V_{L2}$ ratio of volume $V_G$ [$cm^3$] of the raw material to volume $V_{L2}$ [$cm^3$] of the layered product formed of the substrate and the metal-based particle assembly layer in the reaction solution is, for example, 15 or less, preferably 9 or less, and more preferably 6 or less. The ratio is usually 0.1 or more. Increasing the ratio tends to increase the thickness of the protective layer.

The material that can be used to form the protective layer formed of a metal oxide using the sol-gel method is not limited to tetraethyl orthosilicate, and may also be methyltrimethoxysilane, for example.

<Sensor Element>

The layered product according to the present invention, particularly the layered product comprising a plasmonic structure, is suitable for use as an emission enhancing element for sensor elements. A sensor element is, for example, a sensor element used for detecting an analyte, comprising a substrate; a layered product arranged on the substrate; and a capturing portion that is arranged on the layered product and has a capturing substance that specifically binds to the analyte. The layered product may include the above-described protective layer.

FIG. 5 is a cross-sectional view schematically showing one example of the sensor element. The sensor element shown in FIG. 5 includes a substrate 70 having a depression 71 in a surface; the layered product 2 arranged on the substrate 70, more specifically in the depression 71; and a capturing portion 80 that is arranged on the layered product 2 and has a capturing substance that specifically binds to an analyte 90. While the capturing portion 80 is provided on the protective layer of the layered product 2 in the example shown in FIG. 5, the layered product not having the protective layer may be used, and the capturing portion 80 may be provided on the substrate and/or on the metal-based particle assembly layer.

FIG. 5 schematically shows the labeled analyte 90 being captured by the capturing portion 80. In FIG. 5, reference numeral 91 designates the label bound to the analyte 90. Examples of the label include a luminescent substance.

The sensor element detects the analyte 90 as follows: The detection may be qualitative or quantitative, and refers to, for example, identification or quantification of the analyte 90. When excitation light is directed to the labeled analyte 90 specifically bound to the capturing substance on the layered product 2, the label, which is a luminescent substance, is excited. Then, the metal-based particle assembly layer of the layered product 2 resonates with the excited luminescent substance to achieve plasmonic emission enhancement. The analyte 90 can be detected qualitatively or quantitatively by detecting the emission from the excited luminescent substance using a detector. For example, the amount of the analyte 90 that is present can be measured qualitatively or quantitatively by measuring the emission intensity.

In the sensor element comprising the layered product according to the present invention, the layered product comprises the metal-based particle assembly layer and can thereby achieve plasmonic emission enhancement, thus leading to increased detection sensitivity and detection accuracy. For example, it may be conceivable to arrange the metal particle assembly layer on the bottom surface of the depression 71 of the substrate 70, and arrange a bead (corresponding to the substrate of the layered product) not having the metal particle assembly layer in the depression 71 instead of the layered product; however, in this case, if the bead having the capturing portion on the surface has a large particle diameter (for example, on the order of micrometers), the labeled analyte 90 and the metal particle assembly layer may be too far from each other to obtain the plasmonic emission enhancing effect. In contrast, when the layered product comprising the metal-based particle assembly layer is used as a bead arranged in the depression 71, the distance between the labeled analyte 90 and the metal particle assembly layer is reduced, such that the plasmonic emission enhancing effect can be obtained.

Moreover, the layered product in which the metal-based particle assembly layer is arranged on the surface of the substrate and the layered product in which the protective layer is further arranged on the surface of the layered product have surface recesses and projections or may be formed to have surface recesses and projections. The layered product with surface recesses and projections has a larger surface area. Thus, when the layered product is used as the bead, a larger amount of the capturing substance and hence the analyte 90 can be bound to the surface of the layered product. This also contributes to improving the detection sensitivity and detection accuracy.

The analyte 90 is a substance on which a qualitative or quantitative detection is to be performed, and is a substance that specifically binds to the capturing substance. Examples of the analyte 90 include, without particular limitation, nucleosides, nucleotides, nucleic acids, proteins, sugars, glycoproteins, lectin, viruses, cells, antibodies, and exosomes. A sensor element for which the analyte 90 is a biological material or a biologically relevant material is also referred to as a biosensor element.

The nucleic acids mean polymers of phosphates of nucleosides (nucleotide chains) in which purine or pyrimidine bases and sugar are glycosidically linked, and include oligonucleotides including probe DNA, polynucleotides, DNA formed by polymerization of purine nucleotides and pyrimidine nucleotides (full length or fragments thereof), RNA, and polyamide nucleotide derivatives (PNA). The nucleosides are compounds in which bases and sugar are glycosidically linked, and the nucleotides are compounds in which phosphoric acid is linked to the nucleosides; the nucleosides and nucleotides are compounds containing bases.

The term "specifically bind" broadly means chemical bonding including non-covalent bonding, covalent bonding, and hydrogen bonding between substances, for example, interactions between protein molecules and electrostatic interactions between molecules.

The analyte 90 captured can be detected by pre-labeling the analyte 90 with the label 91, which is a luminescent substance, and detecting emission from the label 91. The label 91 may be a labeling substance that specifically binds to a complex obtained by the specific binding between the capturing substance and the analyte 90. The luminescent substance is a substance that emits light upon injection of excitation energy, such as excitation light. The principle of emission of light by the luminescent substance is not limited to a particular principle, and includes fluorescence, phosphorescence, and chemiluminescence. The luminescent substance may be a conventionally known luminescent substance.

The capturing substance constituting the capturing portion 80 is a substance that functions to capture the analyte 90 by specifically binding thereto. The capturing substance is, for example, fixed on the surface of the layered product. The capturing substance is, for example, a substance having binding active groups that can specifically bind to the analyte 90. Examples of such binding active groups include carboxyl and hydroxyl groups that can electrostatically interact with the analyte 90. Examples of the capturing substance include, without particular limitation, nucleosides, nucleotides, nucleic acids, proteins, sugars, and glycoproteins.

Examples of materials of the substrate 70 of the sensor element include silicon, quartz, synthetic quartz, glass, and thermoplastic resins. The layered product is not necessarily limited to being arranged in the depression 71 of the substrate 70, and may be arranged in such a way that it can be fixed or contained in the substrate 70. The substrate 70 can have one or more depressions 71. Examples of the substrate 70 include a flow cell and a microarray.

The sensor element comprising the layered product according to the present invention includes the layered product, which has a broad range of the effect of localized plasmon resonance, and thus, can enhance the emission from the label 91 even if the distance from the metal-based particle assembly layer of the layered product to the label 91 is long, i.e., above 10 nm.

For example, DNA that may be the analyte 90 may have a size of about several nm to several ten nm, and may be 5 nm to 15 nm. For example, a virus may have a size of about several ten nm to several hundred nm, and may be 30 nm to 120 nm. When each of these substances is the analyte 90, the distance between the label 91 bound thereto and the metal-based particle assembly layer may be several ten nm to several hundred nm, for example. The sensor element described above can enhance the emission from the label 91 even in this case.

The distance from the metal-based particle assembly layer to the label 91 may be 15 nm or more, further 25 nm or more, and still further equal to and more than that. The distance is preferably 200 nm or less, more preferably 170 nm or less, and still more preferably 150 nm or less, in view of the sensitivity of the sensor element.

The maximum wavelength of the plasmon peak of the metal-based particle assembly layer preferably coincides with or is close to the emission wavelength of the label 91. This can more effectively increase the emission enhancing effect of plasmon resonance. The maximum wavelength of the plasmon peak of the metal-based particle assembly layer can be controlled by adjusting the metal species, the average particle diameter, the average height, the aspect ratio, and the average interparticle distance and/or the standard deviation of the average interparticle distance of the metal-based particles constituting the metal-based particle assembly layer.

A sensor apparatus comprising the sensor element described above usually includes, in addition to the sensor element, a light source that emits excitation light for exciting the label 91 and a detector that detects emission from the label 91. The light source and the detector may be arranged either on different sides relative to the substrate 70 or on the same side. In one embodiment, the light source is arranged above the substrate 70 (in FIG. 5, above or laterally of the labeled analyte 90), while the detector is arranged below (on the rear side of) the substrate 70, i.e., opposite to the light source relative to the substrate 70, or on the same side as the light source. When the detector is arranged below (on the rear side of) the substrate 70, the substrate 70 preferably has light-transmitting properties, and more preferably is optically transparent. The substrate 70 with light-transmitting properties preferably has a light transmittance of 80% or more, more preferably a light transmittance of 90% or more, with respect to the light that is to be transmitted therethrough.

If the excitation light may be mixed with the emission during detection of the emission, it is preferred to allow the emission to enter the detector through a wavelength cut filter that cuts off light at the wavelength of the excitation light.

Examples of the sensor apparatus include a DNA sequencer, a DNA microarray, a virus sensor, an ion sensor, a plate reader (such as a protein chip, a sugar chain chip, or a lectin chip), a microspectrometer, and a biosensor such as a glucose sensor.

It is noted that when the layered product is used for sensor applications, the layered product may be used without being fixed to a substrate. Examples of such methods of use include use in flow cytometry, and a method in which the layered product is dispersed in a liquid medium, and the labeled analyte 90 is bound to the dispersed layered product to perform analysis.

EXAMPLES

The present invention will be described in more detail with reference to examples, although the present invention is not limited thereto.

Example 1

0.25 mL of a 0.05 mol/L aqueous potassium hydroxide (KOH) solution was added dropwise to 50 mL of a 0.047 mol/L aqueous silver nitrate ($AgNO_3$) solution, and then the mixture was stirred. Upon the addition of aqueous potassium hydroxide solution, the solution turned from clear and colorless to brown in color. To this solution, a 3.5 mol/L aqueous ethylenediamine ($NH_2CH_2CH_2NH_2$) solution was added dropwise in 50 µL portions with stirring, and the addition was stopped when the solution turned clear and colorless. The resulting solution is designated as a silver ion solution A.

16.6 mL of a 0.06 mol/L aqueous glucose solution and 8.4 mL of methanol were mixed to produce a reducing agent solution B. The silver ion solution A was added into a bath, and then 200 mg of silica powder ("Fine Sphere SK-30" produced by Nippon Electric Glass Co., Ltd.; a group of spherical particles with an average particle diameter of 3 µm) as substrates were added into the bath. Then, immediately after addition of the reducing agent solution B into the bath, the solution in the bath was stirred, thereby immersing the substrates in the plating solution containing the silver ion solution A and reducing agent solution B, which initiated growth of the metal-based particles formed of silver on the surfaces of the substrates. The preparation of the plating solution and the immersion of the substrates in the plating solution were performed in an environment at 25° C. The stirring was continued at 25° C. After 28 minutes from the start of immersion, the substrates having the metal-based particle assembly layer (layered products) were filtered off, the filtrate was then washed with a 1:1 by volume mixture of acetone and ultrapure water, and then the supernatant was removed using a centrifuge and then dried at 80° C. to produce layered products.

Example 2

Layered products were produced by performing the metal-based particle assembly layer formation step as in Example 1, except that the concentration of glucose in the aqueous glucose solution used to prepare the reducing agent solution B was changed so that the concentration of the reducing agent and the ratio (in percent) of the concentration of the reducing agent to the saturation concentration were the values as shown in Table 1.

Comparative Example 1

The substrates (silica powder) used in Example 1 were used as the particles of Comparative Example 1. It is noted that the average particle diameter (3 µm) of the silica powder used as the substrates was determined according to the method of measuring the average particle diameter of a group of particles described above.

Table 1 shows, for Examples 1 and 2, the silver ion concentration in the plating solution, the type of reducing agent, the concentration of reducing agent, the ratio (in percent) of the concentration of reducing agent to the saturation concentration, the immersion time of the substrate in the plating solution, the $V_S/V_L$ ratio of volume $V_S$ [$cm^3$] of the substrate to volume $V_L$ [$cm^3$] of the plating solution, and the average height growth rate of the metal-based particles at 28 minutes from the start of deposition of the metal.

In both Examples 1 and 2 in which the silica powder in the form of spherical particles was used as the substrates, the value of X obtained based on the expression shown above was $121 \times 10^{-7}$.

FIGS. 6 and 7 show SEM images (FIG. 6: at a scale of 6000 times; FIG. 7: at a scale of 35000 times) of the layered products obtained in Example 1. FIG. 8 shows a SEM image (at a scale of 20000 times) of the layered products obtained in Example 2. The scanning electron microscope "JSM-5500" produced by JEOL Ltd. was used herein to obtain SEM images, including these SEM images.

From the SEM image, the average particle diameter and average interparticle distance based on the above-described definitions of the silver particles constituting the metal-based particle assembly layer covering the substrates were determined. The average height based on the above-described definition of the silver particles was also determined, based on a STEM cross-sectional image (at a scale of 100000 times). The STEM cross-sectional image was obtained using the scanning transmission electron microscope "Helios G4 UX" produced by FEI Company. The aspect ratio of the silver particles was calculated from the average particle diameter and average height obtained. These results are shown in Table 1. It is noted that, for the layered products of Example 2, a SEM image was obtained (FIG. 8), but the average particle diameter and average interparticle distance were not obtained. As shown in FIG. 8, although the metal-based particle assembly layer of the layered products of Example 2 contained a plurality of metal-based particles arranged apart from each other, the layered products of Example 2 included more regions where the metal-based particles were connected to form a continuous film, as compared to the layered products of Example 1.

For the measurement samples 1 and 2, a fluorescence microscope ("FV1000" produced by Olympus Corporation) was used to measure fluorescence intensities emitted from rhodamine B supported on the layered products (measurement sample 1) and rhodamine B supported on the silica particles (measurement sample 2) when irradiated with laser light.

The conditions for measuring the fluorescence intensities were as follows:
laser excitation wavelength: 559 nm
detection condition: Cy5
objective lens: 40 times In the fluorescence image obtained by the measurement of the measurement sample 1, ten layered products not in contact with others were selected at random, the average value of the "INT" values was calculated, the background value was subtracted from this average value, and the resulting value was obtained as a fluorescence intensity 1. The fluorescence intensity obtained by the measurement of the measurement sample 2 in the same manner was obtained as a fluorescence intensity 2. The layered products not in contact with others (measurement sample 1) and the silica particles not in contact with others (measurement sample 2) were selected because, particularly when the silica particles, which are transparent particles, are in contact with each other, they retroreflect the excitation light and emission inside the particles to each another, which causes variations in fluorescence intensity.

TABLE 1

| | | | | Examples | |
| --- | --- | --- | --- | --- | --- |
| | | | | 1 | 2 |
| Metal-Based Particle Assembly Layer Formation Step | Plating Solution | Silver Ion Concentration | mol/L | 0.031 | 0.031 |
| | | Type of Reducing Agent | — | Glucose | Glucose |
| | | Concentration of Reducing Agent | mol/L | 0.0133 | 0.0421 |
| | | Ratio of Concentration of Reducing Agent to Saturation Concentration | % | 0.50 | 1.59 |
| | | Immersion Time of Substrate in Plating Solution | min | 28 | 28 |
| | | $V_S/V_L$ | — | 0.0012 | 0.0121 |
| Physical Properties of Metal-Based Particle Assembly Layer | | Average Height Growth Rate | nm/min | 3.2 | 4.1 |
| | | Average Particle Diameter | nm | 304.6 | — |
| | | Average Height | nm | 89.7 | 114.0 |
| | | Aspect Ratio | — | 3.40 | — |
| | | Average Interparticle Distance | nm | 36.0 | — |

(Evaluation of Fluorescence Intensity Enhancing Effect)

A spin-on-glass (SOG) solution was spin-coated onto a glass substrate at 3000 rpm, and then the layered products obtained in Example 1 were placed on the SOG coating film. Then, the SOG coating film was dried at 200° C. to fix the layered products. "OCD T-7 5500T" produced by TOKYO OHKA KOGYO CO., LTD, which is an organic SOG material was used as the SOG solution.

Next, rhodamine B solution was spin-coated onto the surface having the layered products fixed thereon at 2000 rpm for 100 seconds to make the fluorescent dye, which is rhodamine B, supported on the surfaces of the layered products. The resulting layered products are designated as measurement sample 1. 0.15 mM rhodamine B solution of "Rhodamine B" produced by Exciton dissolved in ethanol was used as a Rhodamine B solution.

Separately, the fluorescent dye, which is rhodamine B, was supported on the surfaces of the particles of Comparative Example 1, using the same method as described above. The resulting particles are designated as measurement sample 2.

The background value was obtained as follows: For an untreated glass substrate (the same substrate as used in the measurement samples 1 and 2), an image was obtained by measuring the fluorescence intensity under the same conditions as shown above. Ten points were selected at random from this image, and the average value of the "INT" values was calculated and designated as the background value.

The fluorescence intensity 1 was 19.7 times higher than the fluorescence intensity 2.

FIG. 9 shows the image obtained by fluorescence intensity measurement for the measurement sample 1, and FIG. 10 shows the image obtained by fluorescence intensity measurement for the measurement sample 2.

Example 3

A solution was obtained by dissolving 1188 μL of a 25 mass % aqueous ammonia ($NH_3$) solution in 5000 μL of ethanol. This solution was heated to 50° C., and then 24.8 mg of the layered products obtained in Example 1 and 32.4

μL of tetraethyl orthosilicate were added with stirring at the same temperature to produce a reaction solution. The stirring of the reaction solution at 50° C. was continued for 4 hours while subjecting the reaction solution to an ultrasonic treatment, and then the supernatant was removed using a centrifuge, and washed with water and dried at 80° C. sequentially to produce layered products in which a protective layer formed of $SiO_2$ was formed on the metal-based particle assembly layer. The $V_G/V_{L2}$ ratio of volume $V_G$ [cm$^3$] of tetraethyl orthosilicate to volume $V_{L2}$ [cm$^3$] of the layered product formed of the substrate and the metal-based particle assembly layer in the reaction solution was 2.87.

FIGS. 11 and 12 show SEM images (FIG. 11: at a scale of 7000 times; FIG. 12: at a scale of 30000 times) of the obtained layered products including a protective layer. It could be observed from the SEM images that the protective layer was formed over the entire surfaces of the layered products obtained in Example 1. It was also observed that the protective layer was formed not only on the surfaces of the silver particles of the metal-based particle assembly layer, but also in gaps between the silver particles (where the core particle was exposed). It was also observed that the surface of the protective layer had recesses and projections following the recesses and projections of the metal-based particle assembly layer.

FIG. 13 shows a STEM cross-sectional image (at a scale of 100000 times) of the obtained layered products including a protective layer. The STEM cross-sectional image was obtained using the scanning transmission electron microscope "Helios G4 UX" produced by FEI Company. It was observed from this image that a protective layer having a thickness of about 60 to 70 nm was generally uniformly formed.

Example 4

0.75 mL of a 0.05 mol/L aqueous potassium hydroxide (KOH) solution was added dropwise to 150 mL of a 0.047 mol/L aqueous silver nitrate ($AgNO_3$) solution, and then the mixture was stirred. Upon the addition of aqueous potassium hydroxide solution, the solution turned from clear and colorless to brown in color. To this solution, a 3.5 mol/L aqueous ethylenediamine ($NH_2CH_2CH_2NH_2$) solution was added dropwise in 50 μL portions with stirring, and the addition was stopped when the solution turned clear and colorless. The resulting solution is designated as a silver ion solution A.

50 mL of a 0.04 mol/L aqueous glucose solution and 25 mL of methanol were mixed to produce a reducing agent solution B. The silver ion solution A was added into a bath, and then 240 mg of silica powder (a group of spherical particles with an average particle diameter of 1.1 μm produced by JGC Catalysts and Chemicals Ltd.) as substrates were added into the bath. Then, immediately after addition of the reducing agent solution B into the bath, the solution in the bath was stirred, thereby immersing the substrates in the plating solution containing the silver ion solution A and reducing agent solution B, which initiated growth of the metal-based particles formed of silver on the surfaces of the substrates. The preparation of the plating solution and the immersion of the substrates in the plating solution were performed in an environment at 25° C. The stirring was continued at 25° C. After 28 minutes from the start of immersion, the substrates having the metal-based particle assembly layer (layered products) were filtered off, the filtrate was then washed with a 1:1 by volume mixture of acetone and ultrapure water, and then the supernatant was removed using a centrifuge and then dried at 80° C. to produce layered products.

Example 5

5 mL of a 0.05 mol/L aqueous potassium hydroxide (KOH) solution was added dropwise to 666.7 mL of a 0.0024 mol/L aqueous silver nitrate ($AgNO_3$) solution, and then the mixture was stirred. Upon the addition of aqueous potassium hydroxide solution, the solution turned from clear and colorless to brown in color. To this solution, a 3.5 mol/L aqueous ethylenediamine ($NH_2CH_2CH_2NH_2$) solution was added dropwise in 50 μL portions with stirring, and the addition was stopped when the solution turned clear and colorless. The resulting solution is designated as a silver ion solution A.

222.2 mL of a 0.006 mol/L aqueous glucose solution and 111.1 mL of methanol were mixed to produce a reducing agent solution B. The silver ion solution A was added into a bath, and then 46.7 mg of silica powder (a group of spherical particles with an average particle diameter of 0.55 μm produced by JGC Catalysts and Chemicals Ltd.) as substrates were added into the bath. Then, immediately after addition of the reducing agent solution B into the bath, the solution in the bath was stirred, thereby immersing the substrates in the plating solution containing the silver ion solution A and reducing agent solution B, which initiated growth of the metal-based particles formed of silver on the surfaces of the substrates. The preparation of the plating solution and the immersion of the substrates in the plating solution were performed in an environment at 25° C. The stirring was continued at 25° C. After 28 minutes from the start of immersion, the substrates having the metal-based particle assembly layer (layered products) were filtered off, the filtrate was then washed with a 1:1 by volume mixture of acetone and ultrapure water, and then the supernatant was removed using a centrifuge and then dried at 80° C. to produce layered products.

Example 6

0.25 mL of a 0.05 mol/L aqueous potassium hydroxide (KOH) solution was added dropwise to 50 mL of a 0.047 mol/L aqueous silver nitrate ($AgNO_3$) solution, and then the mixture was stirred. Upon the addition of aqueous potassium hydroxide solution, the solution turned from clear and colorless to brown in color. To this solution, a 3.5 mol/L aqueous ethylenediamine ($NH_2CH_2CH_2NH_2$) solution was added dropwise in 50 μL portions with stirring, and the addition was stopped when the solution turned clear and colorless. The resulting solution is designated as a silver ion solution A.

16.6 mL of a 0.06 mol/L aqueous glucose solution and 8.4 mL of methanol were mixed to produce a reducing agent solution B. The silver ion solution A was added into a bath, and then 362 mg of alumina powder ("Advanced Alumina AA-3" produced by Sumitomo Chemical Co., Ltd.; a group of particles with an irregular shape with an average particle diameter of 3 μm) as substrates were added into the bath. Then, immediately after addition of the reducing agent solution B into the bath, the solution in the bath was stirred, thereby immersing the substrates in the plating solution containing the silver ion solution A and reducing agent solution B, which initiated growth of the metal-based particles formed of silver on the surfaces of the substrates. The preparation of the plating solution and the immersion of the substrates in the plating solution were performed in an environment at 25° C. The stirring was continued at 25° C. After 28 minutes from the start of immersion, the substrates having the metal-based particle assembly layer (layered products) were filtered off, the filtrate was then washed with a 1:1 by volume mixture of acetone and ultrapure water, and then the supernatant was removed using a centrifuge and then dried at 80° C. to produce layered products.

Example 7

A solution was obtained by dissolving 1188 µL of a 25 mass % aqueous ammonia ($NH_3$) solution in 5000 µL of ethanol. This solution was heated to 50° C., and then 24.8 mg of the layered products obtained in Example 1 and 5.0 µL of tetraethyl orthosilicate were added with stirring at the same temperature to produce a reaction solution. The stirring of the reaction solution at 50° C. was continued for 4 hours while subjecting the reaction solution to an ultrasonic treatment, and then the supernatant was removed using a centrifuge, and washed with water and dried at 80° C. sequentially to produce layered products in which a protective layer formed of $SiO_2$ was formed on the metal-based particle assembly layer. The $V_G/V_{L2}$ ratio of volume $V_G$ [$cm^3$] of tetraethyl orthosilicate to volume $V_{L2}$ [$cm^3$] of the layered product formed of the substrate and the metal-based particle assembly layer in the reaction solution was 0.443.

A STEM cross-sectional image was obtained as in Example 3. It was observed from this image that a protective layer having a thickness of about 20 nm was generally uniformly formed.

Example 8

A solution was obtained by dissolving 1188 µL of a 25 mass % aqueous ammonia ($NH_3$) solution in 5000 µL of ethanol. This solution was heated to 50° C., and then 24.8 mg of the layered products obtained in Example 1 and 15.0 µL of tetraethyl orthosilicate were added with stirring at the same temperature to produce a reaction solution. The stirring of the reaction solution at 50° C. was continued for 4 hours while subjecting the reaction solution to an ultrasonic treatment, and then the supernatant was removed using a centrifuge, and washed with water and dried at 80° C. sequentially to produce layered products in which a protective layer formed of $SiO_2$ was formed on the metal-based particle assembly layer. The $V_G/V_{L2}$ ratio of volume $V_G$ [$cm^3$] of tetraethyl orthosilicate to volume $V_{L2}$ [$cm^3$] of the layered product formed of the substrate and the metal-based particle assembly layer in the reaction solution was 1.33.

A STEM cross-sectional image was obtained as in Example 3. It was observed from this image that a protective layer having a thickness of about 85 nm was generally uniformly formed.

Example 9

A solution was obtained by dissolving 1188 µL of a 25 mass % aqueous ammonia ($NH_3$) solution in 5000 µL of ethanol. This solution was heated to 50° C., and then 24.8 mg of the layered products obtained in Example 1 and 32.4 µL of tetraethyl orthosilicate were added with stirring at the same temperature to produce a reaction solution. The stirring of the reaction solution at 50° C. was continued for 4 hours while subjecting the reaction solution to an ultrasonic treatment, and then the supernatant was removed using a centrifuge, and washed with water and dried at 80° C. sequentially to produce layered products in which a protective layer formed of $SiO_2$ was formed on the metal-based particle assembly layer. The $V_G/V_{L2}$ ratio of volume $V_G$ [$cm^3$] of tetraethyl orthosilicate to volume $V_{L2}$ [$cm^3$] of the layered product formed of the substrate and the metal-based particle assembly layer in the reaction solution was 2.87.

A STEM cross-sectional image was obtained as in Example 3. It was observed from this image that a protective layer having a thickness of about 110 nm was generally uniformly formed.

Table 2 shows, for Examples 4 to 6, the silver ion concentration in the plating solution, the type of reducing agent, the concentration of reducing agent, the ratio (in percent) of the concentration of reducing agent to the saturation concentration, the immersion time of the substrate in the plating solution, the $V_S/V_L$ ratio of volume $V_S$ [$cm^3$] of the substrate to volume $V_L$ [$cm^3$] of the plating solution, and the average height growth rate of the metal-based particles at 28 minutes from the start of deposition of the metal.

The values of X obtained based on the expression shown above for the substrates used in Examples 4 to 6 were $101 \times 10^{-7}$ for Example 4, $41 \times 10^{-7}$ for Example 5, and $110 \times 10^{-7}$ for Example 6.

FIGS. 14 to 18 show SEM images of the layered products obtained in Examples 5 to 9, respectively. From the SEM images, the average particle diameter and average interparticle distance based on the above-described definitions of the silver particles constituting the metal-based particle assembly layer covering the substrates were determined. The average height based on the above-described definition of the silver particles was also determined, based on a STEM cross-sectional image (at a scale of 100000 times). The STEM cross-sectional image was obtained using the scanning transmission electron microscope "Helios G4 UX" produced by FEI Company. The aspect ratio of the silver particles was calculated from the average particle diameter and average height obtained. These results are shown in Table 2.

TABLE 2

| | | | | Examples | | |
| --- | --- | --- | --- | --- | --- | --- |
| | | | | 4 | 5 | 6 |
| Metal-Based Particle Assembly Layer Formation Step | Plating Solution | Silver Ion Concentration | mol/L | 0.031 | 0.0016 | 0.031 |
| | | Type of Reducing Agent | — | — | Glucose | Glucose | Glucose |
| | | Concentration of Reducing Agent | mol/L | 0.0089 | 0.00133 | 0.0133 |

TABLE 2-continued

|  |  |  | Examples | | |
| --- | --- | --- | --- | --- | --- |
|  |  |  | 4 | 5 | 6 |
|  | Ratio of Concentration of Reducing Agent to Saturation Concentration | % | 0.34 | 0.06 | 0.60 |
|  | Immersion Time of Substrate in Plating Solution | min | 28 | 28 | 28 |
|  | $V_S/V_L$ | — | 0.0005 | 0.00002 | 0.0012 |
|  | Average Height Growth Rate | nm/min | 2.8 | 2.9 | 3.0 |
| Physical Properties of Metal-Based Particle Assembly Layer | Average Particle Diameter | nm | 235.4 | 321.4 | 187.6 |
|  | Average Height | nm | 71.3 | 110.6 | 83.9 |
|  | Aspect Ratio | — | 3.80 | 2.91 | 2.26 |
|  | Average Interparticle Distance | nm | 39.0 | 15.4 | 35.0 |

(Evaluation of Fluorescence Intensity Enhancing Effect)

For layered products of Examples 4, 6, 7, and 9, the fluorescence intensity enhancing effect was evaluated using the same method as for the layered products obtained in Example 1. As a result, the fluorescence intensity 1 of the layered products of Examples 4, 6, 7, or 9 was 4.5, 1.3, 18, or 4.6 times higher than the fluorescence intensity 2, respectively. The fluorescence intensity 2 refers to the fluorescence intensity emitted from the measurement sample 2, in which the fluorescent dye, which is rhodamine B, was supported on the surfaces of the particles used as the substrates in each example, as in the evaluation for the layered products obtained in Example 1.

REFERENCE SIGNS LIST

1, 2: layered product, 10: substrate, 20: metal-based particle, 30: protective layer, 50: bath, 60: plating solution, 70: substrate, 71: depression, 80: capturing portion, 90: analyte, 91: label

The invention claimed is:

1. A method for producing a layered product, the layered product comprising:
a substrate having a three-dimensional surface; and
a metal-based particle assembly layer arranged on the three-dimensional surface and comprising a plurality of metal-based particles arranged apart from each other,
the method comprising a step of:
forming the metal-based particle assembly layer on the three-dimensional surface by immersing a plurality of the substrate in a plating solution containing a cation of a metal constituting the metal-based particles to reduce the cation,
wherein a $V_S/V_L$ ratio of the total volume $V_S$ [cm$^3$] of the plurality of the substrate in the plating solution to volume $V_L$ [cm$^3$] of the plating solution is 0.00001 or more and 0.03 or less.

2. The method according to claim 1, wherein in the metal-based particle assembly layer of the layered product, the plurality of metal-based particles have an average particle diameter of 5 nm or more and 1600 nm or less.

3. The method according to claim 1, wherein in the metal-based particle assembly layer of the layered product, the plurality of metal-based particles are each arranged so that an average distance between metal-based particles adjacent to each other is 1 nm or more and 150 nm or less.

4. The method according to claim 1, wherein in the step of forming the metal-based particle assembly layer, an average height growth rate of the metal-based particles at 28 minutes from the start of deposition of the metal onto the three-dimensional surface is 6 nm/min or less.

5. The method according to claim 1, wherein the substrate is a core particle having a spherical shape, a spheroidal shape or a polyhedral shape, or
the substrate is a core particle having a curved surface and a flat surface.

6. The method according to claim 5, wherein the step of forming the metal-based particle assembly layer satisfies the following expression (1):

$$10 \times 10^{-7} \leq X \leq 600 \times 10^{-7} \quad (1)$$

wherein, when the substrate is a core particle having a spherical shape, X is represented by the following expression:

$$X = \left(\frac{3aVD}{4\pi BC} + R^3\right)^{\frac{1}{3}} - R \quad \text{[Expression 1]}$$

wherein the unit of X is centimeters (cm); a represents the cation concentration (mol/L) in the plating solution; V represents the volume (L) of the plating solution; D represents the atomic weight of the metal (zero-valent) produced by reduction of the cation; B represents the particle number (particles) of the substrate; C represents the specific gravity (g/cm$^3$) of the metal (zero-valent) produced by reduction of the cation; and R represents the radius (cm) of the particle; and
when the substrate is a core particle having a spheroidal shape or a polyhedral shape, or the substrate is a core particle having a curved surface and a flat surface, X is represented by the following expression:

$$X = \frac{aVD}{SC} \quad \text{[Expression 2]}$$

wherein the unit of X is centimeters (cm); and a, V, D, and C represent the same meanings as set forth above; and S represents a sum total of surface areas of the particle.

7. The method according to claim 1, wherein the plating solution further contains a reducing agent capable of reducing the cation.

8. The method according to claim 7, wherein the reducing agent has a standard redox potential of −0.5 V or more.

9. The method according to claim 7, wherein the reducing agent is glucose.

10. The method according to claim 1, wherein the plating solution further contains a complexing agent.

11. The method according to claim 10, wherein the complexing agent is ammonia or an amine-based complexing agent.

12. The method according to claim 1, further comprising, after the step of forming the metal-based particle assembly layer, a step of forming a protective layer comprising an insulating material on the metal-based particle assembly layer.

13. The method according to claim 12, wherein the protective layer is formed using a sol-gel method.

14. The method according to claim 12, wherein the insulating material is $SiO_2$.

15. The method according to claim 12, wherein the protective layer has a thickness of 300 nm or less.

* * * * *